United States Patent
Martinelli et al.

(10) Patent No.: US 12,530,146 B2
(45) Date of Patent: Jan. 20, 2026

(54) TOGGLING KNOWN PATTERNS FOR READING MEMORY CELLS IN A MEMORY DEVICE

(71) Applicant: Micron Technology, Inc., Boise, ID (US)

(72) Inventors: Andrea Martinelli, Bergamo (IT); Ferdinando Bedeschi, Biassono (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/861,680

(22) Filed: Jul. 11, 2022

(65) Prior Publication Data

US 2024/0012576 A1    Jan. 11, 2024

(51) Int. Cl.
*G06F 3/06*    (2006.01)
*G11C 13/00*    (2006.01)

(52) U.S. Cl.
CPC .......... *G06F 3/0655* (2013.01); *G06F 3/0604* (2013.01); *G06F 3/0652* (2013.01); *G06F 3/0679* (2013.01); *G11C 13/0004* (2013.01); *G11C 13/004* (2013.01); *G11C 13/0069* (2013.01); *G11C 13/0097* (2013.01)

(58) Field of Classification Search
CPC .... G06F 3/0655; G06F 3/0652; G06F 3/0604; G06F 3/0679; G11C 13/0004; G11C 3/004; G11C 13/0097; G11C 13/0069
See application file for complete search history.

(56) References Cited

U.S. PATENT DOCUMENTS

| | | | |
|---|---|---|---|
| 2012/0188820 A1* | 7/2012 | Neumeyer | G11C 7/14 365/185.2 |
| 2012/0271982 A1* | 10/2012 | Callaghan | G11C 16/26 711/E12.008 |
| 2015/0134890 A1* | 5/2015 | Beattie | G11C 29/022 711/167 |
| 2019/0198069 A1* | 6/2019 | Kale | G11C 29/36 |

* cited by examiner

*Primary Examiner* — Mark A Giardino, Jr.
(74) *Attorney, Agent, or Firm* — Greenberg Traurig

(57) ABSTRACT

Systems, methods, and apparatus for a memory device. In one approach, known reference patterns are stored in a memory array. The patterns are associated with codewords stored in the memory array. A first pattern has all memory cells written to a first logic state (e.g., all logic ones), and a second pattern has all memory cells written to an opposite second logic state (e.g., all logic zeros). When a controller reads a codeword, the controller first reads memory cells of the associated reference patterns to determine data for estimating a threshold voltage distribution of memory cells in the codeword. Based on a number of memory cells of the reference patterns that snap when reading the first and second patterns, the controller selects a read voltage for reading the associated codeword.

27 Claims, 11 Drawing Sheets

TOGGLING KNOWN PATTERNS FOR READING MEMORY CELLS IN A MEMORY DEVICE

FIELD OF THE TECHNOLOGY

At least some embodiments disclosed herein relate to memory devices in general, and more particularly, but not limited to memory devices that toggle or swap known reference patterns to select voltages for reading memory cells.

BACKGROUND

Memory devices are widely used to store information in various electronic devices such as computers, wireless communication devices, cameras, digital displays, and the like. Information is stored by programming different states of a memory device. For example, binary devices have two states, often denoted by a logic "1" or a logic "0". In other systems, more than two states may be stored. To access the stored information, a component of the electronic device may read, or sense, the stored state in the memory device. To store information, a component of the electronic device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory cells may maintain their stored logic state for extended periods of time even in the absence of an external power source. Volatile memory cells may lose their stored state over time unless they are periodically refreshed by an external power source.

A storage device is an example of a memory device. Typical computer storage devices have controllers that receive data access requests from host computers and perform programmed computing tasks to implement the requests in ways that may be specific to the media and structure configured in the storage devices. In one example, a memory controller manages data stored in memory and communicates with a computer device. In some examples, memory controllers are used in solid state drives for use in mobile devices or laptops, or media used in digital cameras.

Firmware can be used to operate a memory controller for a particular storage device. In one example, when a computer system or device reads data from or writes data to a memory device, it communicates with the memory controller.

Memory devices typically store data in memory cells. In some cases, memory cells exhibit non-uniform, variable electrical characteristics that may originate from various factors including statistical process variations, cycling events (e.g., read or write operations on the memory cells), or a drift (e.g., a change in resistance of a chalcogenide alloy), among others.

In one example, reading a set of data (e.g., a codeword, a page) is carried out by determining a read voltage (e.g., an estimated median of threshold voltages) of memory cells that store the set of data. In some cases, a memory device may include an array of PCM cells arranged in a 3D architecture, such as a cross-point architecture to store the set of data. PCM cells in a cross-point architecture may represent a first logic state (e.g., a logic 1, a SET state) associated with a first set of threshold voltages, or a second logic state (e.g., a logic 0, a RESET state) associated with a second set of threshold voltages. In some cases, data may be stored using encoding (e.g., error correction coding (ECC)) to recover data from errors in the data stored in the memory cells.

For resistance variable memory cells (e.g., PCM cells), one of a number of states (e.g., resistance states) can be set. For example, a single level cell (SLC) may be programmed to one of two states (e.g., logic 1 or 0), which can depend on whether the cell is programmed to a resistance above or below a particular level. As an additional example, various resistance variable memory cells can be programmed to one of multiple different states corresponding to multiple data states, e.g., 10, 01, 00, 11, 111, 101, 100, 1010, 1111, 0101, 0001, etc. Such cells may be referred to as multi state cells, multi-digit cells, and/or multi-level cells (MLCs).

The state of a resistance variable memory cell can be determined (e.g., read) by sensing current through the cell responsive to an applied interrogation voltage. The sensed current, which varies based on the resistance of the cell, can indicate the state of the cell (e.g., the binary data stored by the cell). The resistance of a programmed resistance variable memory cell can drift (e.g., shift) over time. Resistance drift can result in erroneous sensing of a resistance variable memory cell (e.g., a determination that the cell is in a state other than that to which it was programmed, among other issues).

A PCM cell, for example, may be programmed to a reset state (amorphous state) or a set state (crystalline state). A reset pulse (e.g., a pulse used to program a cell to a reset state) can include a relatively high current pulse applied to the cell for a relatively short period of time such that the phase change material of the cell melts and rapidly cools, resulting in a relatively small amount of crystallization. Conversely, a set pulse (e.g., a pulse used to program a cell to a set state) can include a relatively lower current pulse applied to the cell for a relatively longer time interval and with a slower quenching speed, which results in an increased crystallization of the phase change material.

A programming signal can be applied to a selected memory cell to program the cell to a target state. A read signal can be applied to a selected memory cell to read the cell (e.g., to determine the state of the cell). The programming signal and the read signal can be current and/or voltage pulses, for example.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
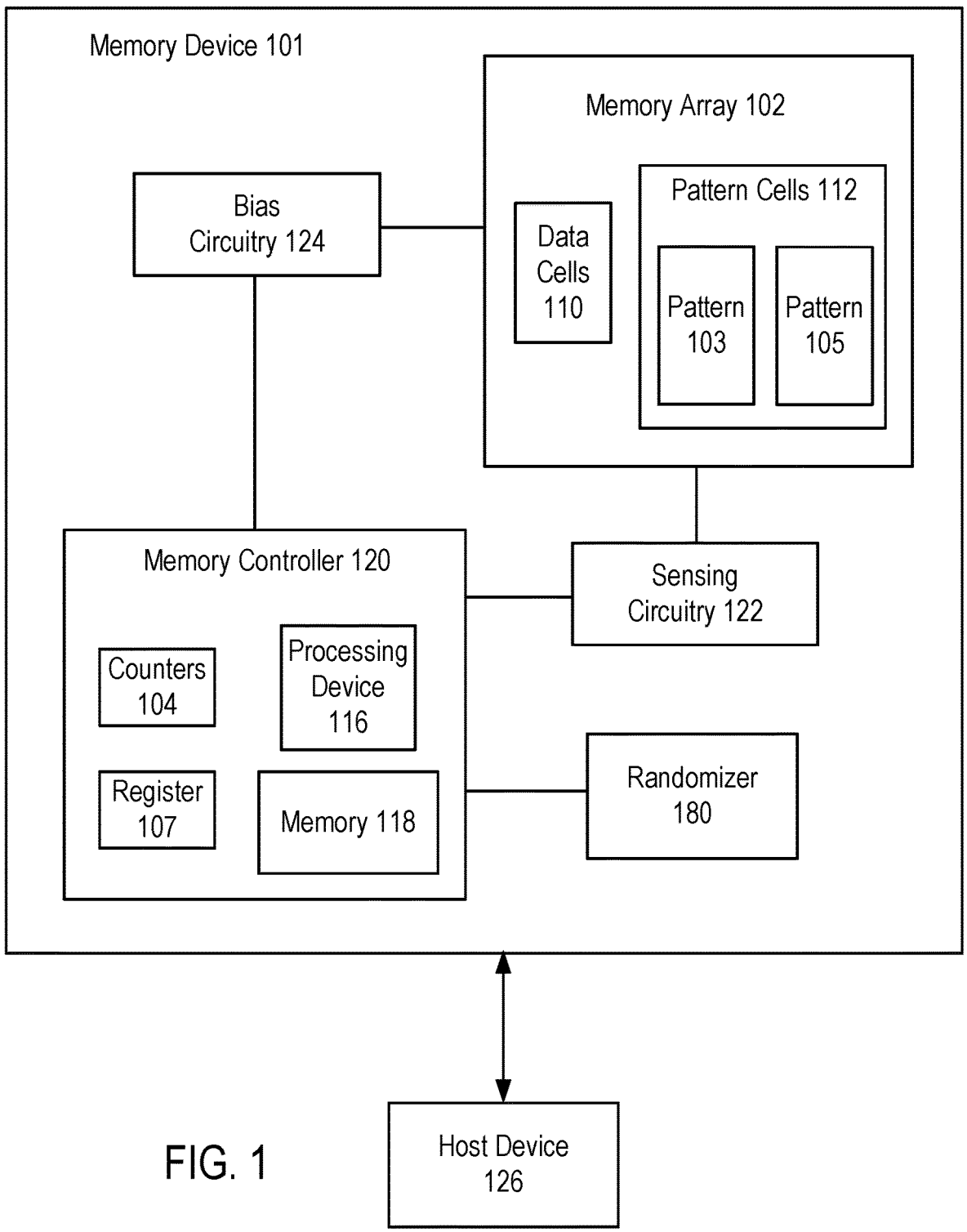
FIG. 1 shows a memory device that uses reference patterns to select a read voltage for performing read operations, in accordance with some embodiments.

The following disclosure describes various embodiments for memory devices that toggle or swap known reference patterns (e.g., swapping 64 bits of all logic 1's with 64 bits of all logic 0's) to select voltages for reading memory cells (e.g., memory cells of a three-dimensional cross-point memory array). At least some embodiments herein relate to memory devices that use bipolar operations for a memory array. In one example, bipolar select voltages are used to select memory cells of the memory array. In one example, the memory cells are arranged in a cross-point architecture. In one example, each memory cell is formed using a single select device. In one example, the select device includes a chalcogenide material that switches (e.g., snaps) when a sufficient voltage is applied across the memory cell.

The memory device may, for example, store data used by a host device (e.g., a computing device of an autonomous vehicle, or another computing device that accesses data stored in the memory device). In one example, the memory device is a solid-state drive mounted in an electric vehicle.

In some cases, a memory device may include an array of memory cells arranged in a three-dimensional (3D) architecture, such as a cross-point architecture, to store the set of data. The memory cells in a cross-point architecture may, for example, represent a first logic state (e.g., a logic 1, a SET state) associated with a first set of threshold voltages, or a second logic state (e.g., a logic 0, a RESET state) associated with a second set of threshold voltages.

In other embodiments, the memory cells may be arranged in a three-dimensional (3D) vertical architecture. A 3D vertical architecture may include memory cells located at the crossing between a vertical access line (e.g., a bitline pillar), and each one of a plurality of second access lines (e.g., wordlines), formed in horizontal planes or decks parallel to each other.

More generally, an integrated circuit memory cell, such as a memory cell in a cross-point memory or a 3D vertical array, can be programmed to store data by the way of its state at a voltage applied across the memory cell. For example, if a memory cell is configured or programmed in such a state that allows a substantial current to pass the memory cell at a voltage in a predefined voltage region, the memory cell is considered to have been configured or programmed to store a first bit value (e.g., one or zero); and otherwise, the memory cell is storing a second bit value (e.g., zero or one).

Optionally, a memory cell can be configured or programmed to store more than one bit of data by being configured or programmed, for example, to have a threshold voltage in one of more than two separate voltage regions.

The threshold voltage of a memory cell is such that when the voltage applied across the memory cell is increased to above the threshold voltage, the memory cell switches by changing rapidly or abruptly, snapping (e.g., for a chalcogenide memory cell), or jumping from a non-conductive state to a conductive state. The non-conductive state allows a small leak current to go through the memory cell; and in contrast, the conductive state allows more than a threshold amount of current to go through. Thus, a memory device can use a sensor (e.g., sense amplifier) to detect the change, or determine the conductive/non-conductive state of the memory device at one or more applied voltages, to evaluate or classify the level of the threshold voltage of the memory cell and thus its stored data.

The threshold voltage of a memory cell being configured/programmed to be in different voltage regions can be used to represent different data values stored in the memory cell. For example, the threshold voltage of the memory cell can be programmed to be in any of four predefined voltage regions; and each of the regions can be used to represent the bit values of a different two-bit data item. Thus, when given a two-bit data item, one of the four voltage regions can be selected based on a mapping between two-bit data items and voltage regions; and the threshold voltage of the memory cell can be adjusted, programmed, or configured to be in the selected voltage region to represent or store the given two-bit data item. To retrieve, determine, or read the data item from the memory cell, one or more read voltages can be applied across the memory cell to determine which of the four voltage regions contain the threshold voltage of the memory cell. The identification of the voltage region that contains the threshold voltage of the memory cell provides the two-bit data item that has been stored, programmed, or written into the memory cell.

For example, a memory cell can be configured or programmed to store a one-bit data item in a Single Level Cell (SLC) mode, or a two-bit data item in a Multi-Level Cell (MLC) mode, or a three-bit data item in a Triple Level Cell (TLC) mode, or a four-bit data item in a Quad-Level Cell (QLC) mode.

The threshold voltage of a memory cell can change or drift over a period of time, usage, and/or read operations, and in response to certain environmental factors, such as temperature changes. The rate of change or drift can increase as the memory cell ages. The change or drift can result in errors in determining, retrieving, or reading the data item back from the memory cell.

Random errors in reading memory cells can be detected and corrected using redundant information. Data to be stored into memory cells can be encoded to include redundant information to facilitate error detection and recovery. When data encoded with redundant information is stored in a memory sub-system, the memory sub-system can detect errors in data represented by the voltage regions of the threshold voltages of the memory cells and/or recover the original data that is used to generate the data used to program the threshold voltages of the memory cells. The recovery operation can be successful (or have a high probability of success) when the data represented by the threshold voltages of the memory cells and thus retrieved directly from the memory cells in the memory sub-system contains fewer errors, or the bit error rate in the retrieved data is low and/or when the amount of redundant information is high. For example, error detection and data recovery can be performed using techniques such as Error Correction Code (ECC), Low-Density Parity-Check (LDPC) code, etc.

When the data retrieved from the memory cells of the memory sub-system has too many errors for successful decoding, the memory sub-system may retry the execution of the read command. Voltage pulses applied during read retry can cause threshold voltages previously programmed into separate regions to move closer to each other and into a common region and thus reduce the readability of memory cells.

Read retry can be used in memory operation systems to perform a re-read operation on a target codeword (CW), with the desired goal of achieving various benefits including error correction, re-programming, etc. In some cases, a read retry may be triggered directly after determining that fails from reading a codeword are beyond an ECC tolerance (e.g., a tolerance threshold). In one example of a codeword (CW) read from a chalcogenide memory array, if a memory device is implementing bipolar read, bits of different states can have been affected by different drift times following prior programming of the bits.

It is difficult to know and/or predict an average threshold voltage for a distribution of data cells to be read (e.g., data cells in a codeword). When reading a codeword to determine data cells in, for example, a logic 1 or SET state, an initial read voltage is selected that is sufficiently low so that data cells in a logic 0 or RESET state are not inadvertently disturbed (e.g., read disturb due to a large number of reads of adjacent memory cells) and then gradually increased higher in small steps as needed to complete a read operation. However, if the initial read voltage is selected to be too low, then gradual stepping of the read voltage to an adequately high voltage can require significant time. This can significantly increase the time required for read operations, and thus can reduce the read bandwidth for a memory device.

In some cases, a threshold voltage distribution of data cells (e.g., codewords) can be tracked using a set of known pattern (KP) cells. For example, KP cells or bits are used to track a distribution, and the KP bits are read in parallel during a read of the data cells. In one example, each codeword has additional KP bits, and the KP bits are programmed to logic 1 at the same time as the codeword is written. The KP bits may be a few cells (e.g., 8 cells). Also, the KP bits may be specific for each logic state (e.g., KP0 bits for a logic 1 or SET state, and KP1 bits for a logic 0 or RESET state). During a read algorithm, the position of the data cell distribution can be estimated by observing behavior of known pattern cells when a voltage ramp is applied.

Some memory devices that use known patterns are able to achieve a lower bit error rate (BER) because they use a self-reference approach during read operations. This approach removes the need to rely on a fixed reference such as a demarcation voltage (e.g., VDM). The known patterns are programmed to have a minimum number of cells in each distribution. A voltage applied to read data cells in, for example, a page is modified according to a rate at which pattern cells are being detected.

Various approaches can be used in an attempt to achieve roughly the same number of cells in each distribution. In an example of a counter-based algorithm, the number of cells in each distribution is fixed and known, and this is used to understand when a read voltage ramp has retrieved the whole pattern. In an example of a mean estimator, the cells in each distribution are used to get an estimate of the position of the average of the distribution, and to choose a proper offset to be applied on the average to include all of the cell population.

The above methods are more reliable than using a fixed reference such as a demarcation voltage for several reasons. First, every shift of distributions which needs to be accounted in the choice of the reference is automatically included in the pattern (e.g., cells of the pattern will automatically follow all of the various shifts induced by temperature, process, cycling, etc.). Also, worst-case scenarios (e.g., placing the reference voltage halfway between the worst-case tails of the distributions) does not apply since it is unlikely to have at the same time in the same page the worst case for both the upper and lower distributions. Finally, there is less stress (e.g., read disturb) on the unselected cells since the applied voltage is adapted to the pattern which is being read.

Although known patterns as described above may provide some advantages, memory devices that are implemented for storage use cases (e.g., a solid-state drive using logical block addresses (LBAs) to store data for a host) can present technical problems even when using existing known pattern approaches to help select read voltages. For example, in a storage-like scenario where all the codewords of a same block are erased to the same pattern, it is typically recommended to keep all the cells in the erased blocks in the same physical state. This is suggested because of various considerations including the read window budget (RWB). Usually, some states are more stable than others (e.g., drift increases the read window over time).

Another consideration is performance (e.g., time/energy). It is better to have a program operation handle only one transition (e.g., only one state to avoid polarity changes, program the state which needs lower voltages, etc.).

In light of the above considerations, an erased block typically uses an erased pattern with all the cells in the RESET state. This is done because a bigger drift of the RESET state as compared to the SET state allows larger read margins. Also, for a SET state, the cells can be programmed using lower voltages.

However, using an erased pattern with all cells in the RESET state as described above can present significant technical problems. For example, when attempting to improve read operations by using known patterns to read the erased blocks, there are no SET cells available in a codeword that can be used to track the status of memory cell threshold voltage distributions. This is because the erased block only contains cells in the erased RESET state. Furthermore, the RESET distribution cannot be used since snapping of memory cells in a RESET state would corrupt the pattern. Also, for performance and power reasons a nondestructive read is preferred.

In addition to the above, in some cases the wear and cycling of known pattern cells can vary significantly from corresponding data cells to be read. For example, pattern cells may remain written to all logic 1s, while in contrast, data cells may be exposed to numerous erase/write cycles. This can cause the pattern cells over time to become a poor proxy for the data cell distribution.

To address the above and other technical problems, a memory device adds fixed patterns to data (e.g., codewords) when writing the data to a memory array. One of the fixed patterns has memory cells in a SET state, and the other of the fixed patterns has memory cells in a RESET state. For example, the two patterns are added when writing the codeword to the memory array.

In one embodiment, for a storage-like scenario, data is stored in blocks using logical block addresses (LBAs). All memory cells in an erased block are kept in the RESET state. When erasing or writing a block, two patterns are associated with the block. For example, one of the patterns has 64 cells in the SET state (e.g., KP0), and the other pattern has 64 cells in the RESET state (e.g., KP1).

In one embodiment, the SET cells and the RESET cells of the patterns are separated and stored in two different reference tiles of the memory array. The SET and RESET cells of the patterns are toggled or swapped at every ERASE and PROGRAM command for the block (e.g., a command that operates on any data stored in the block). In one example of swapping, the logic state of patterns cells is changed so that SET cells become RESET cells, and RESET cells become SET cells. In this way, the reference SET cells are always tracking the SET cells of the data cells in the associated block (e.g., same number of cycles, same drift, etc.).

An advantage of the foregoing is that SET pattern cells are available both for program and erase operations for the block. Also, because SET and RESET pattern cells are located in different tiles, concurrent programming of the SET and RESET pattern cells can be done.

In one example, each reference tile has 64 pattern cells. The number of pattern cells should be chosen to be sufficiently high to achieve read reliability when using the fixed pattern. One consideration is the read window budget (RWB). The RWB depends on the implemented algorithm. In one example, the fixed SET cells are used to track the average threshold of the distributions, and then apply a voltage offset (e.g., 0.5V) large enough to snap all the cells of the tails (e.g., to achieve a typical storage bit error rate (BER) value). In one example, for a 4 kilobyte (KB) codeword, use of 64 plus 64 pattern bits requires a pattern overhead of only about 0.4 percent. In one example, a guard band (TH) is provided to handle open bits (e.g., defective cells). For example, each pattern can have a guard band added of 2 bits.

In one embodiment, a memory device includes a memory array having memory cells that store codewords (e.g., to store data for a host using a storage specification or a memory specification). The memory device further includes bias circuitry to apply voltages to the memory cells when reading and writing the codewords, and sensing circuitry to read the memory cells. The memory device further includes a controller to write a first codeword, and a first pattern (e.g., SET cells) and a second pattern (e.g., RESET cells) associated with the first codeword. In one example, the first and second patterns are added to the first codeword when writing the first codeword. The first pattern corresponds to a first average threshold voltage, the second pattern corresponds to a second average threshold voltage, and a magnitude of the first average threshold voltage is lower than a magnitude of the second average threshold voltage.

The controller applies, using the bias circuitry, a voltage (e.g., voltage ramp) to memory cells of the first and second patterns. The controller determines, using the sensing circuitry, a number of the memory cells of the first and second patterns that switch (e.g., threshold or snap) when applying the voltage. The controller determines when the number of memory cells that switch has reached a threshold (e.g., 64 memory cells).

In response to determining that the threshold is reached, the controller determines a read voltage based on the voltage applied to the memory cells (e.g., read voltage is based on the voltage of the ramp when the threshold is reached). Then, the controller reads the first codeword by applying, using the bias circuitry, the read voltage to memory cells of the first codeword.

Various advantages are provided by at least some embodiments described herein. In one advantage, more quickly and/or accurately determining an initial read voltage reduces the number of voltage steps required for a read operation. Also, pattern cells have a wear and cycling that is more comparable to data cells than in prior approaches.

FIG. 1 shows a memory device 101 that uses reference patterns to select a read voltage for performing read operations, in accordance with some embodiments. Memory device 101 includes a memory array 102 having data cells 110 and pattern cells 112. The data cells 110 generally store data (e.g., user data stored for host device 126). The pattern cells 112 generally store various reference patterns (e.g., known pattern of all 1s). For example, two reference patterns are associated with each codeword or block stored in data cells 110.

During a read operation to read a codeword, memory controller 120 reads the reference patterns associated with the codeword. For example, controller 120 counts a number of pattern cells 112 that snap when being read. Based on the number that snap, controller 120 selects a read voltage for reading the codeword. In one example, the read voltage is a current voltage applied to the pattern cells 112 when a threshold number of cells snap, plus the addition of an offset voltage.

In one embodiment, the pattern cells 112 are organized into various patterns including patterns 103, 105. Each of patterns 103, 105 includes memory cells of the same type. Also, the memory cells in the patterns 103, 105 are of the same type as the memory cells that store data (e.g., data cells 110). In one example, each of the patterns 103, 105 includes a relatively small number of cells such as 60-65 cells as compared to the number of cells (e.g., 256 to 4 KB) in a codeword.

Each pattern 103, 105 is associated with a codeword stored in data cells 110. Each pattern 103, 105 has pattern cells in a different logic state. For example, each of the pattern cells 112 in pattern 103 is written or programmed to store only a first logic state that corresponds to a low voltage threshold magnitude. In one example, the first logic state is a logic one (1) or SET state for a positive polarity. Each of the pattern cells 112 in pattern 105 is written or programmed to store only a second logic state that corresponds to a high voltage threshold magnitude. In one example, the second logic state is a logic zero (0) or RESET state for a positive polarity. Data cells 110 store data (e.g., user data for host device 126) in either the first logic state or the second logic state.

In one embodiment, pattern cells 112 are configured so that the operating history for pattern cells 112 is the same as or similar to data cells 110. In one example, each pattern 103, 105 is configured to correspond to a respective set of data cells 110. In one example, pattern cells 112 are in a same location of memory array 102 as data cells 110. In one example, the same location is the same tile or partition of memory array 102. In one example, the same location is a location on a same access line as data cells 110. In one example, the same location is on the same wordline as used to select data cells 110.

When performing a read operation, bias circuitry 124 applies voltages to pattern cells 112. In one example, bias circuitry 124 includes wordline and bitline drivers (not shown) to bias wordlines and bitlines of memory array 102.

Memory controller 120 determines which pattern cells 112 switch. In one example, controller 120 determines that a number of memory cells in the pattern that switch (e.g., threshold or snap) is greater than a threshold. In one example, the threshold is 50-95% or more of the memory cells in a pattern switching. Counters 104 can be used to count the number of memory cells that switch in a pattern 103, 105 and/or a number of data cells 110 that switch when being read.

Sensing circuitry 122 is used to read pattern cells 112 and data cells 110. In one example, sensing circuitry 122 includes sense amplifiers for sensing a characteristic associated with memory cells of the memory array 102. The characteristic can be, for example, a voltage and/or current associated with a selected memory cell.

Controller 120 causes bias circuitry 124 to apply voltages to each of the pattern cells 112 of patterns 103, 105. The voltages can be applied in parallel so that each pattern 103, 105 can be sensed by sensing circuitry 122 simultaneously. In one example, the voltages are increasing magnitudes of voltage values applied to each pattern 103, 105 (e.g., +2, +2.5, +3, +3.5, +4, +4.5, +5 V) separated by steps (e.g., 0.5 V steps). In one example, the voltages are separated by equal steps. In one example, the voltages are separated by steps that vary in size. The variation in the size of the steps can be determined by controller 120 based on an operating context of memory device 101, such as an error rate or other characteristic associated with prior reading of data cells of memory array 102.

After the voltages are applied to pattern cells 112, controller 120 determines which of the cells switch for each pattern. Controller 120 uses data or signals from sensing circuitry 122 that indicate which pattern cells 112 have switched.

Based on determining a number of pattern cells 112 that switch, controller 120 determines an initial read voltage to use when reading (e.g., user data) from data cells 110 that are associated with the pattern cells 112. In one example, bias circuitry 124 applies this initial read voltage to data cells 110 when starting a read. In one example, bias circuitry 124 jumps to this initial read voltage during a read of data cells 110.

Memory controller 120 includes one or more processing devices 116 and memory 118. In one example, memory 118 stores firmware executed by processing device 116 to select and apply the read voltages.

Memory controller 120 can use bias circuitry 124 to generate voltages for applying read and other voltages (e.g., initial read and read retry). Bias circuitry 124 can also generate voltages for applying write voltages to data cells 110, and/or pattern cells 112 as part of programming operations. Bias circuitry 124 may be used to generate read voltages for read operations performed on memory array 102 (e.g., in response to a read command from host device 126).

Sensing circuitry 122 can be used to sense a state of each memory cell in memory array 102. In one example, sensing circuitry 122 includes sense amplifiers used to detect a current caused by applying various voltages to memory cells in memory array 102. In one example, bias circuitry 124 applies a read voltage to data cells 110 or pattern cells 112. Sensing circuitry 122 senses a current associated with each of the data cells 110 or pattern cells 112 caused by applying the read voltage.

In one example, if sensing circuitry 122 determines that the current for a memory cell is greater than a fixed threshold (e.g., a predetermined level of current), then memory controller 120 determines that the memory cell has switched (e.g., snapped).

In one embodiment, memory controller 120 receives a write command from a host device 126. The write command is accompanied by data (e.g., user data of a user of host device 126) to be written to memory array 102. In response to receiving the write command, controller 120 initiates a programming operation.

In one embodiment, controller 120 uses one of counters 104 to count the number of data or pattern cells that snap as a read voltage is applied. Data stored in counters 104 can be used as part of an evaluation when determining a read voltage to apply. This stored data can optionally be used in combination with error results from ECC of read data when selecting the read voltage (e.g., a read retry voltage). For example, the stored data and/or ECC results can be provided as inputs to a machine learning model (e.g., artificial neural network) to provide an output of a voltage to use for read retry.

Controller 120 includes one or more registers 107. In one embodiment, each register 107 can store data regarding a state of pattern cells 112 and/or data cells 110. In one example, register 107 stores data indicating which of patterns 103, 105 is in a SET state. In one example, register 107 stores data indicating which of patterns 103, 105 was most recently erased. In one example, register 107 stores data indicating whether data cells 110 store inverted data or data that is not inverted.

Memory device 101 includes randomizer 180. In one embodiment, controller 120 uses randomizer 180 to determine, for each write operation to store data in data cells 110, whether to toggle or swap patterns 103, 105. In one example, randomizer 180 is configured so that controller 120 on average determines to toggle or swap patterns 103, 105 for 50% (or other selected percentage) of write operations.

In one example, controller 120 may use write voltages (e.g., write pulses) to write a logic state to a memory cell, such as data cell 110 or pattern cell 112 during a write or programming operation. The write pulses may be applied by providing a first voltage to a bitline and providing a second voltage to a wordline to select the memory cell. Circuits coupled to access lines to which memory cells may be coupled may be used to provide the write voltages (e.g., access line drivers included in decoder circuits). The circuits may be controlled by internal control signals provided by a control logic (e.g., controller 120). The resulting voltage applied to the memory cell is the difference between the first and second voltages. The write pulses may be the same duration as read pulses in some embodiments. In some embodiments the duration is 10-50 ns. In some embodiments, the duration is 1-100 ns. In some embodiments, the duration is 1 ns to 1 microsecond. Writing to the memory cell may take the same time as reading the memory cell in some embodiments.

In one example, the polarity of the read or write pulses may be either a first polarity or a second polarity. For example, a write pulse may apply a voltage to a memory cell in a first polarity (e.g., bitline at 6V and wordline at 0V).

In one example, circuits coupled to access lines to which memory cells may be coupled are used to provide read pulses (e.g., access line drivers included in decoder circuits). The circuits may be controlled by internal control signals provided by a control logic (e.g., controller 120). A read voltage or pulse may be a voltage applied to a memory cell for a period of time (e.g., 10-50 ns, 1-100 ns, 1 ns to 1 microsecond). In some embodiments, the read pulse may be a square pulse. In some embodiments, the read pulse may be a ramp, that is, a linearly-increasing voltage may be applied across the memory cell.

In one example, after being accessed (e.g., selected), a memory cell may be read, or sensed, by a sense component (e.g., sensing circuitry 122) to determine the stored state of the memory cell. For example, a voltage may be applied to the memory cell (using a wordline and bitline) and the presence of a resulting current may depend on the applied voltage and the threshold voltage of the memory cell. In some cases, more than one voltage may be applied. Additionally, if an applied voltage does not result in current flow, other voltages may be applied until a current is detected by the sense component. By assessing the voltage that resulted in current flow, the stored logic state of the memory cell may be determined. In some cases, the voltage may be ramped up in magnitude until a current flow is detected (e.g., a memory cell turns on, switches on, conducts current, or becomes activated). In other cases, predetermined voltages may be applied sequentially until a current is detected. Likewise, a current may be applied to a memory cell, and the magnitude of the voltage to create the current may depend on the electrical resistance or the threshold voltage of the memory cell.

In some cases, the memory cell (e.g., a PCM cell) includes a material that changes its crystallographic configuration (e.g., between a crystalline phase and an amorphous phase), which in turn, determines a threshold voltage of the memory cell to store information. In other cases, the memory cell includes a material that remains in a crystallographic configuration (e.g., an amorphous phase) that may exhibit variable threshold voltages to store information.

The sense component may include various transistors or amplifiers in order to detect and amplify a difference in the signals. The detected logic state of the memory cell may then be output through a column decoder as output. In some cases, the sense component may be part of a column decoder or a row decoder.

Figure 2:
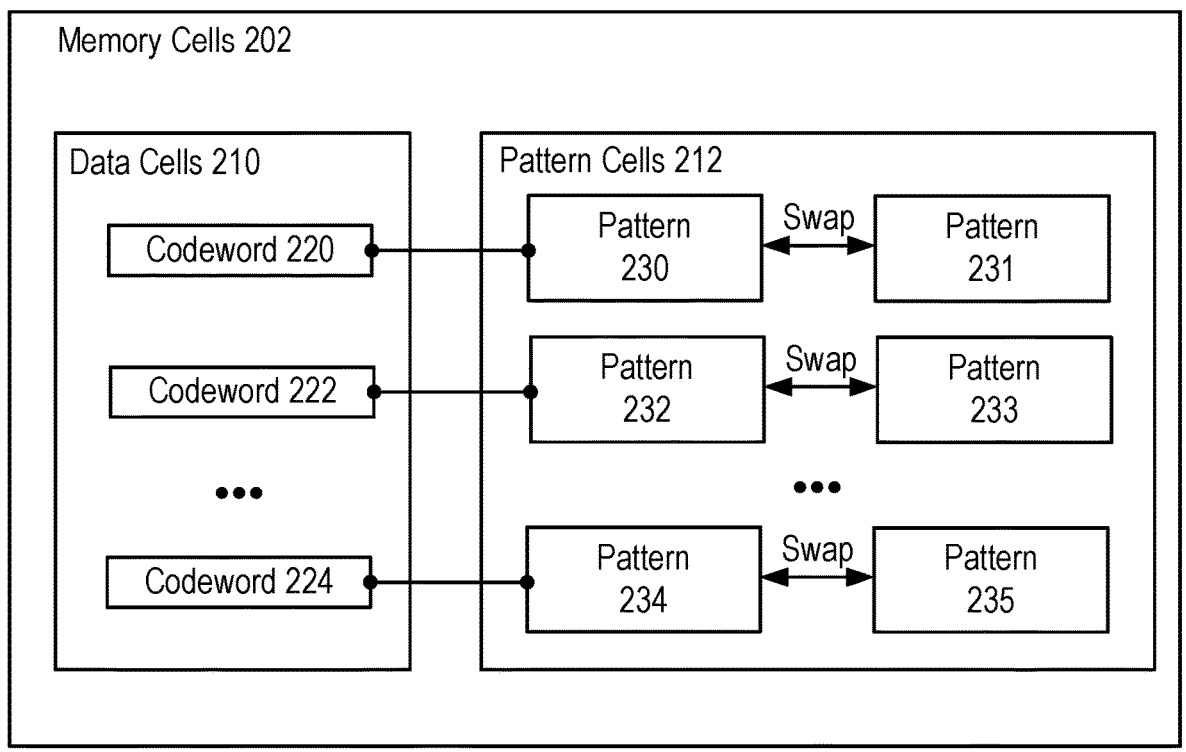
FIG. 2 shows stored codewords where each codeword is associated with two reference patterns, in accordance with some embodiments.

FIG. 2 shows stored codewords where each codeword is associated with two reference patterns, in accordance with some embodiments. Memory cells 202 includes data cells 210 and pattern cells 212. In one example, memory array 102 includes memory cells 202. Data cells 210 is an example of data cells 110, and pattern cells 212 is an example of pattern cells 112.

The codewords are stored in data cells 210, and the associated reference patterns are stored in pattern cells 212. For example, codeword 220 is associated with patterns 230, 231; codeword 222 is associated with patterns 232, 233; and codeword 224 is associated with patterns 234, 235. In one example, patterns 230, 231 are added to codeword 220 as codeword 220 is written by controller 120.

In one embodiment, as each codeword is written to data cells 210, the associated two patterns are swapped. For example, pattern 230 initially contains all logic ones, and pattern 231 initially contains all logic zeros after writing codeword 220. When codeword 220 is later written again, pattern 230 is changed to all logic zeros, and pattern 231 is changed to all logic ones. By swapping the patterns, the wear on the pattern cells in the patterns is the same or similar as the wear on data cells in the associated codeword. This allows the pattern cells to provide an improved proxy or estimate of the threshold voltage distribution for the data cells of the codeword.

In one example, when reading codeword 222, patterns 232, 233 are read to determine a number of memory cells in patterns 232, 233 that snap. The voltage at which the number of cells that snap reaches a threshold is used by a controller to determine a read voltage for reading codeword 222. In one example, the threshold is set to equal a number of memory cells expected to be in a SET state. These cells in the SET state will be in either pattern 232 or pattern 233, depending on the last swap of the patterns at a prior write operation.

In some embodiments, the patterns are not swapped on every write operation associated with the codeword. For example, patterns 234, 235 can be swapped every other write operation associated with codeword 224, or other interval. Swapping can also be randomized as described herein.

In another example, codeword 224 is a block of data in a storage device. Patterns 234, 235 are swapped each time that the block of data is erased. Patterns 234, 235 are swapped the first time that the block is programmed after being erased. However, subsequent programming of the block after being erased does not cause swapping of patterns 234, 235. Instead, patterns 234, 235 are not swapped again until the block is erased.

Figure 3:
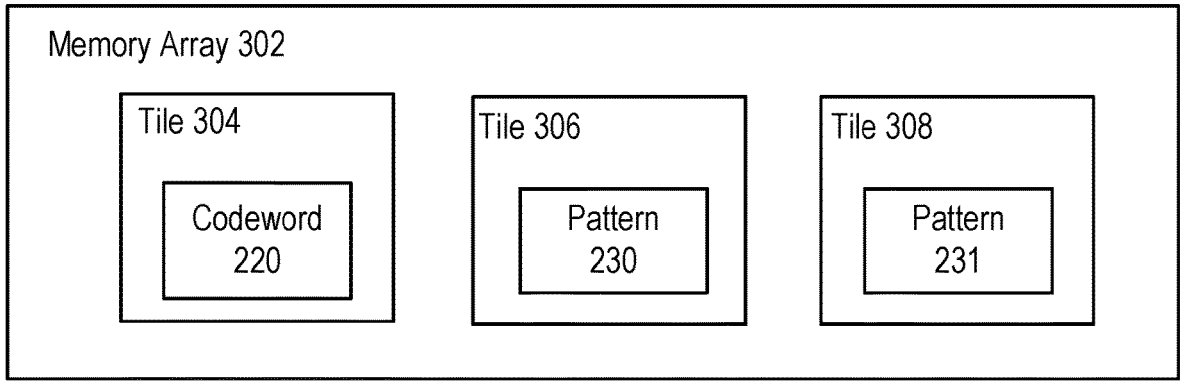
FIG. 3 shows an example of tiles in a memory array that store codewords and reference patterns, in accordance with some embodiments.

FIG. 3 shows an example of tiles in a memory array 302 that store codewords and reference patterns, in accordance with some embodiments. Memory array 302 is an example of memory array 102. Memory array 302 includes tiles 304, 306, 308. Tile 304 stores codeword 220, tile 306 stores pattern 230, and tile 308 stores pattern 231. In one example, memory cells in tiles 304, 306, 308 are selected using a common wordline.

Figure 4:
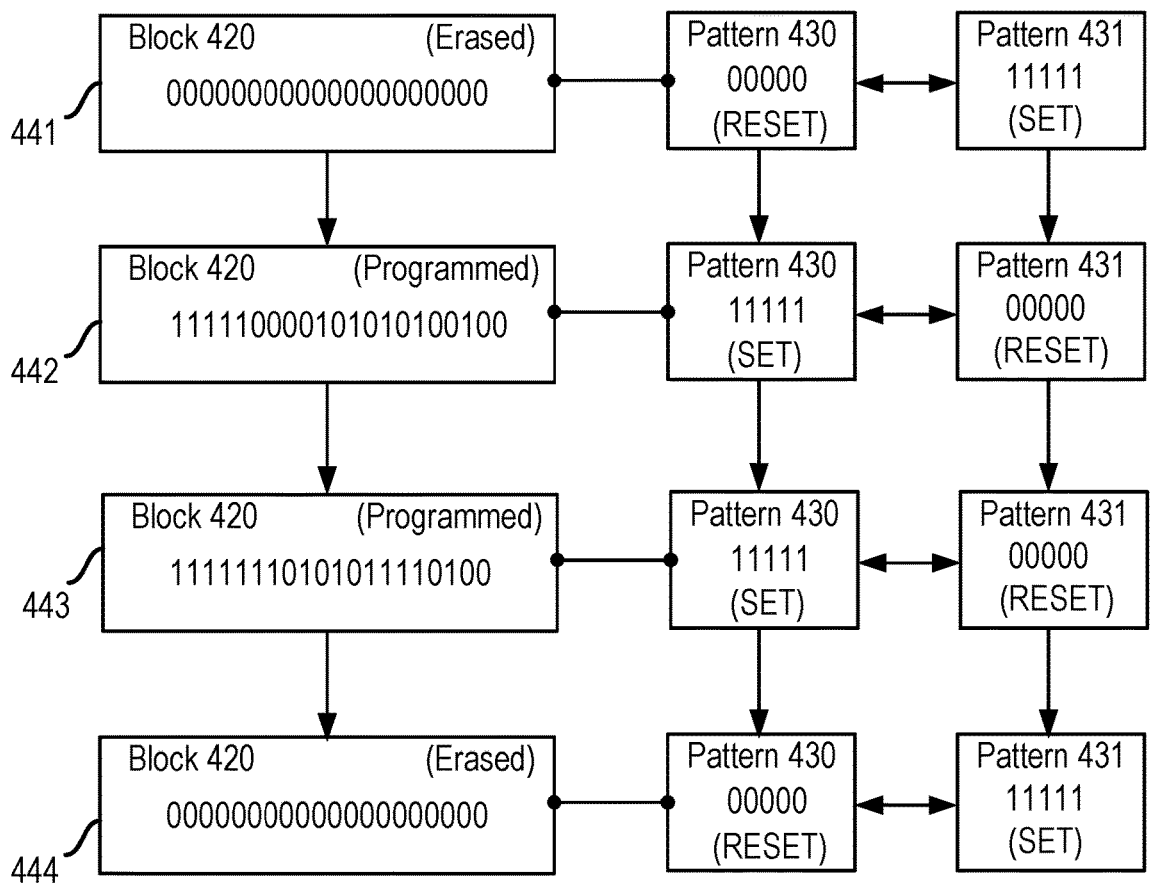
FIG. 4 shows exemplary stages of erase and program operations for a block of user data, in accordance with some embodiments.

FIG. 4 shows exemplary stages 441, 442, 443, 444 of erase and program operations for a block 420 of user data, in accordance with some embodiments. Block 420 is an example of codeword 224 in FIG. 2. In one example, block 420 is one of many blocks accessed by a controller for a host device storing data in a solid-state drive. The controller accesses the blocks using logical block addresses (LBAs) received from the host device. In one example, all memory cells in block 420 must be erased in a single operation. However, memory cells in block 420 can be individually programmed.

For example, at stage 441, block 420 is in a fully-erased state with all memory cells being logic zeros (a RESET state). Patterns 430, 431 are associated with block 420. Pattern 430 has pattern cells all as logic zeros corresponding to a RESET state. Pattern 431 has pattern cells all as logic ones corresponding to a SET state. Patterns 430, 431 are examples of patterns 234, 235.

Patterns 430, 431 are swapped each time block 420 is erased. Patterns 430, 431 are also swapped with the first programming of block 420 following block 420 being erased. However, patterns 430, 431 are not swapped for the second and subsequent programming of block 420.

For example, at stage 442, block 420 has been programmed. This is the first programming of block 420 subsequent to block 420 being erased. Patterns 430, 431 have been swapped. Specifically, the memory cells of pattern 430 have been programmed to all logic ones corresponding to a SET state. The memory cells of pattern 431 have all been erased to all logic zeros corresponding to a RESET state.

At stage 443, block 420 is programmed again. However, patterns 430, 431 are not swapped. Specifically, pattern 430 remains as all logic ones, and pattern 431 remains as all logic zeros.

At stage 444, block 420 is erased. Patterns 430, 431 are swapped. Specifically, pattern 430 is swapped from logic ones to logic zeros. Pattern 431 is swapped from logic zeros to logic ones.

Figure 5:
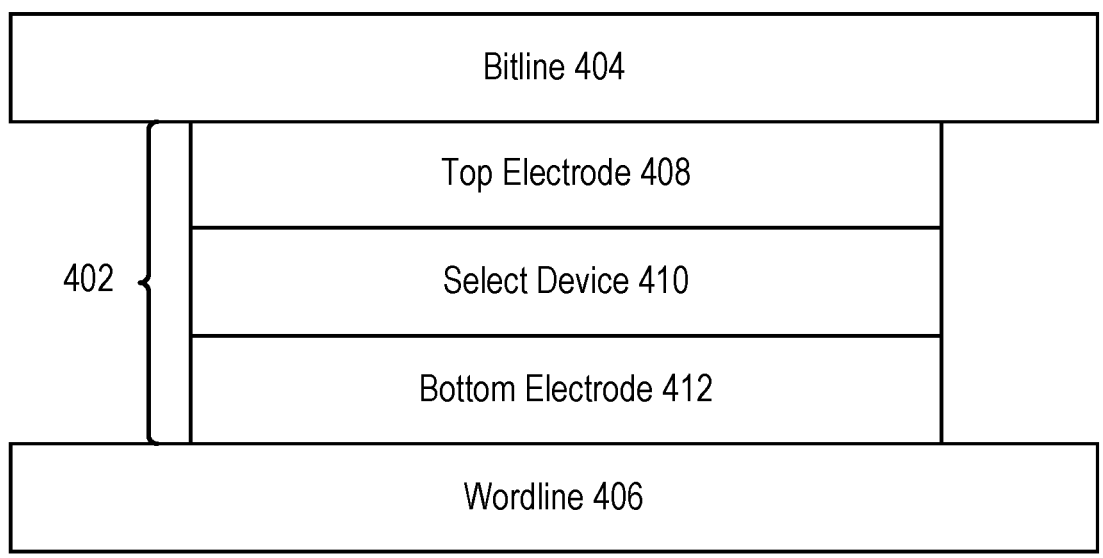
FIG. 5 shows an example of a memory cell that includes a select device, in accordance with some embodiments.

FIG. 5 shows an example of a memory cell 402 that includes a select device, in accordance with some embodiments. In one example, select device 410 includes a chalcogenide. Memory cell 402 is an example of data cells 110 and/or pattern cells 112.

Top electrode 408 conductively connects select device 410 to bitline 404, and bottom electrode 412 conductively connects select device 410 to wordline 406. In one example, electrodes 408, 412 are formed of a carbon material.

In one example, select device 410 includes a chalcogenide (e.g., chalcogenide material and/or chalcogenide alloy). Threshold voltage properties of the select device may be based on the voltage polarities applied to the memory cell.

In one example, a logic state may be written to memory cell 402, which may correspond to one or more bits of data. A logic state may be read from or written to the memory cell by applying voltages of different polarities at different voltage and/or current magnitudes. The reading and writing protocols may take advantage of different threshold voltages of the select device that result from the different polarities. In other words, when the memory cell is a self-selecting memory cell implemented using a selector/memory device, the select device 410 may be used as both a selecting element and a storage element of the cell 402.

Figure 6:
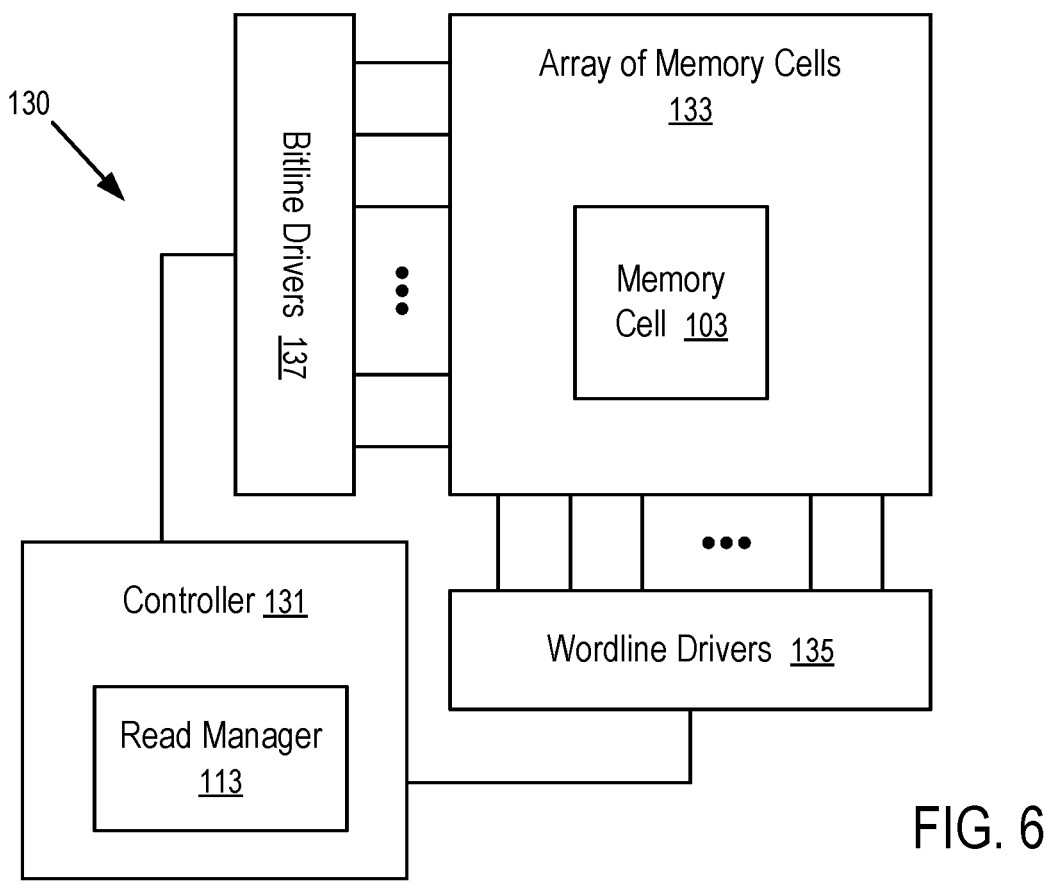
FIG. 6 shows a memory device configured with a read manager to select read voltages according to one embodiment.

FIG. 6 shows a memory device 130 configured with a read manager 113 to select read voltages according to one embodiment. Memory device 130 is an example of memory device 101. In FIG. 6, the memory device 130 includes an array 133 of memory cells, such as a memory cell 103. Memory cell 103 is an example of data cell 110, or pattern cell 112.

In one example, an array 133 can be referred to as a tile; and a memory device (e.g., 130) can have one or more tiles. Different tiles can be operated in parallel in a memory device (e.g., 130).

For example, the memory device 130 illustrated in FIG. 6 can have a cross-point memory having at least the array 133 of memory cells (e.g., 103). In another example, the memory device 130 illustrated in FIG. 6 can have a 3D vertical architecture having at least the array 133 of memory cells (e.g., 103).

In some implementations, the cross-point memory uses a memory cell 103 that has an element (e.g., a sole element) acting both as a selector device and a memory device. For example, the memory cell 103 can use a single piece of alloy with variable threshold capability. The read/write operations of such a memory cell 103 can be based on thresholding the memory cell 103 while inhibiting other cells in sub-threshold bias, in a way similar to the read/write operations for a memory cell having a first element acting as a selector device and a second element acting as a phase-change memory device that are stacked together as a column. A selector device usable to store information can be referred to as a selector/memory device.

The memory device 130 of FIG. 6 includes a controller 131 that operates bitline drivers 137 and wordline drivers 135 to access the individual memory cells (e.g., 103) in the array 133.

Figure 7:
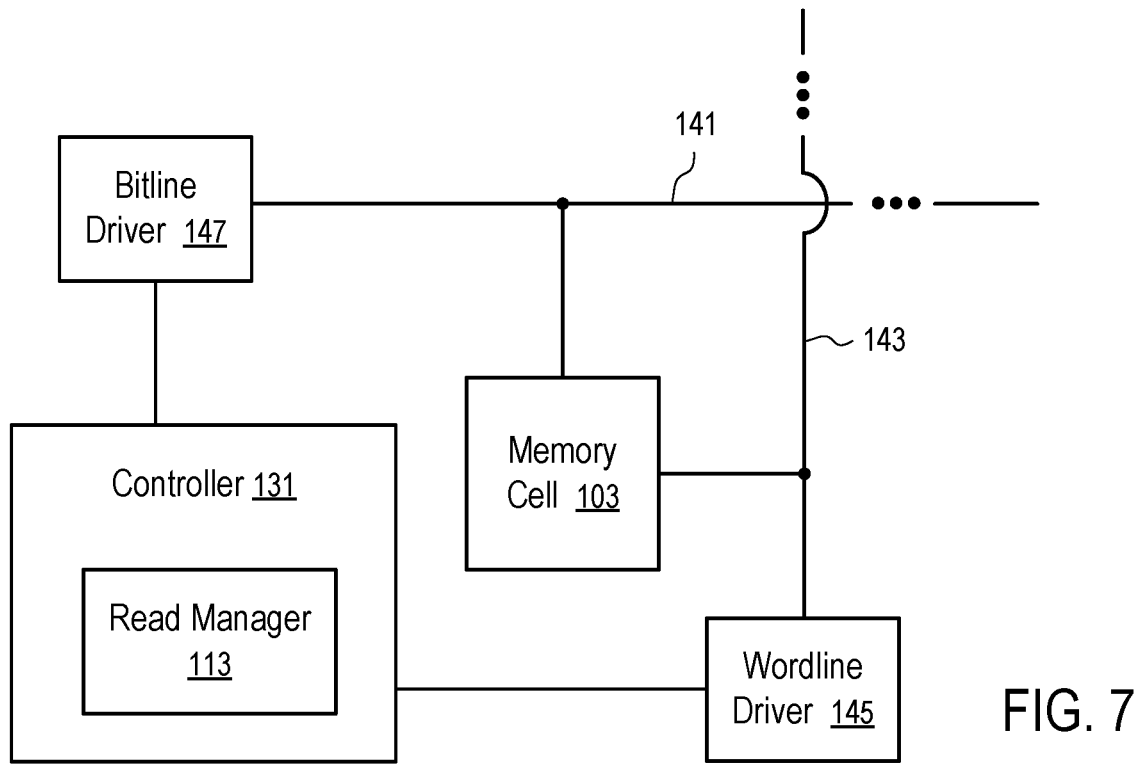
FIG. 7 shows a memory cell with a bitline driver and a wordline driver configured to apply voltages according to one embodiment.

For example, each memory cell (e.g., 103) in the array 133 can be accessed via voltages driven by a pair of a bitline driver 147 and a wordline driver 145, as illustrated in FIG. 7.

The controller 131 includes a read manager 113 configured to implement a process that determines one or more read voltages for reading data cells based on data obtained from applying voltages to two patterns (e.g., 230, 231) of pattern cells. The read manager 113 can be implemented, for example, via logic circuits and/or microcode/instructions. For example, during a read retry, the read manager 113 uses a read voltage having a magnitude larger than a read voltage previously used to read the memory cell (e.g., 103). The increase in the read voltage can be based on reading pattern cells (e.g., counting snaps of pattern cells). The read voltage with the increased magnitude applied to the memory cell (e.g., 103) can be sufficient to obtain the error free data from the memory cell (e.g., 103).

FIG. 7 shows a memory cell 103 with a bitline driver 147 and a wordline driver 145 configured to apply voltages (e.g., ramps) according to one embodiment. For example, the memory cell 103 can be a typical memory cell 103 in the memory cell array 133 of FIG. 6.

The bitline driver 147 and the wordline driver 145 of FIG. 7 are controlled by the read manager 113 of the controller 131 to selectively apply one or more voltages to the memory cell 103. The bitline driver 147 and the wordline driver 145 can apply voltages of different polarities on the memory cell 103.

For example, in applying one polarity of voltage (e.g., positive polarity), the bitline driver 147 drives a positive voltage relative to the ground on a bitline 141 connected to a row of memory cells in the array 133; and the wordline driver 145 drives a negative voltage relative to the ground on a wordline 143 connected to a column of memory cells in the array 133.

In applying the opposite polarity of voltage (e.g., negative polarity), the bitline driver 147 drives a negative voltage on the bitline 141; and the wordline driver 145 drives a positive voltage on the wordline 143.

The memory cell 103 is in both the row connected to the bitline 141 and the column connected to the wordline 143. Thus, the memory cell 103 is subjected to the voltage difference between the voltage driven by the bitline driver 147 on the bitline 141 and the voltage driven by the wordline driver 145 on the wordline 143.

In general, when the voltage driven by the bitline driver 147 is higher than the voltage driven by the wordline driver 145, the memory cell 103 is subjected to a voltage in one polarity (e.g., positive polarity); and when the voltage driven by the bitline driver 147 is lower than the voltage driven by the wordline driver 145, the memory cell 103 is subjected to a voltage in the opposite polarity (e.g., negative polarity).

In some implementations, the memory cell 103 is a self-selecting memory cell implemented using a selector/memory device. The selector/memory device has a chalcogenide (e.g., chalcogenide material and/or chalcogenide alloy). For example, the chalcogenide material can include a chalcogenide glass such as, for example, an alloy of selenium (Se), tellurium (Te), arsenic (As), antimony (Sb), carbon (C), germanium (Ge), and silicon (Si). A chalcogenide material can primarily have selenium (Se), arsenic (As), and germanium (Ge) and be referred to as SAG-alloy. SAG-alloy can include silicon (Si) and be referred to as SiSAG-alloy. In some embodiments, the chalcogenide glass can include additional elements such as hydrogen (H), oxygen (O), nitrogen (N), chlorine (Cl), or fluorine (F), each in atomic or molecular forms.

The selector/memory device has a top side and a bottom side. A top electrode is formed on the top side of the selector/memory device for connecting to a bitline 141; and a bottom electrode is formed on the bottom side of the selector/memory device for connecting to a wordline 143. For example, the top and bottom electrodes can be formed of a carbon material. For example, a chalcogenide material of the memory cell 103 can take the form of a crystalline atomic configuration or an amorphous atomic configuration. The threshold voltage of the memory cell 103 can be dependent on the ratio of the material in the crystalline configuration and the material of the amorphous configuration in the memory cell 103. The ratio can change under various conditions (e.g., having currents of different magnitudes and directions going through the memory cell 103).

A self-selecting memory cell 103, having a selector/memory device, can be programmed to have a threshold voltage window. The threshold voltage window can be created by applying programming pulses with opposite polarity to the selector/memory device. For example, the memory cell 103 can be biased to have a positive voltage difference between two sides of the selector/memory device and alternatively, or to have a negative voltage difference between the same two sides of the selector/memory device. When the positive voltage difference is considered in positive polarity, the negative voltage difference is considered in negative polarity that is opposite to the positive polarity. Reading can be performed with a given/fixed polarity. When programmed, the memory cell has a low threshold (e.g., lower than the cell that has been reset, or a cell that has been programmed to have a high threshold), such that during a read operation, the read voltage can cause a programmed cell to snap and thus become conductive while a reset cell remains non-conductive.

For example, to program the voltage threshold of the memory cell 103, the bitline driver 147 and the wordline driver 145 can drive a pulse of voltage onto the memory cell 103 in one polarity (e.g., positive polarity) to snap the memory cell 103 such that the memory cell 103 is in a conductive state. While the memory cell 103 is conductive, the bitline driver 147 and the wordline driver 145 continue driving the programming pulse to change the threshold voltage of the memory cell 103 towards a voltage region that represents the data or bit value(s) to be stored in the memory cell 103.

The controller 131 can be configured in an integrated circuit having a plurality of decks of memory cells. Each deck can be sandwiched between a layer of bitlines, a layer of wordlines; and the memory cells in the deck can be arranged in an array 133. A deck can have one or more arrays or tiles. Adjacent decks of memory cells may share a layer of bitlines (e.g., 141) ora layer of wordlines (e.g., 143). Bitlines are arranged to run in parallel in their layer in one direction; and the wordlines are arranged to run in parallel in their layer in another direction orthogonal to the direction of the bitlines. Each of the bitlines is connected to a row of memory cells in the array; and each of the wordlines is connected to a column of memory cells in the array. Bitline drivers 137 are connected to bitlines in the decks; and wordline drivers 135 are connected to wordlines in the decks. Thus, a typical memory cell 103 is connected to a bitline driver 147 and a wordline driver 145.

The threshold voltage of a typically memory cell 103 is configured to be sufficiently high such that when only one of its bitline driver 147 and wordline driver 145 drives a voltage in either polarity while the other voltage driver holds the respective line to the ground, the magnitude of the voltage applied across the memory cell 103 is insufficient to cause the memory cell 103 to become conductive. Thus, addressing the memory cell 103 can be performed via both of its bitline driver 147 and wordline driver 145 driving a voltage in opposite polarity relative to the ground for operating/selecting the memory cell 103. Other memory cells connected to the same wordline driver 145 can be de-selected by their respective bitline drivers holding the respective bitlines to the ground; and other memory cells connected to the same bitline driver can be de-selected by their respective wordline drives holding the respective wordlines to the ground.

A group of memory cells (e.g., 103) connected to a common wordline driver 145 can be selected for parallel operation by their respective bitline drivers (e.g., 147) driving up the magnitude of voltages in one polarity while the wordline driver 145 is also driving up the magnitude of a voltage in the opposite polarity. Similarly, a group of memory cells connected to a common bitline driver 147 can be selected for parallel operation by their respective wordline drivers (e.g., 145) driving voltages in one polarity while the bitline driver 147 is also driving a voltage in the opposite polarity.

At least some examples are disclosed herein in reference to a cross-point memory having self-selecting memory cells. Other types of memory cells and/or memory can also be used. For example, memory cells each having a selector device and a phase-change memory device and/or flash memory cells can also be used in at least some embodiments. Additionally or alternatively, the memory can have a different architecture, such as a 3D vertical architecture.

Figure 8:
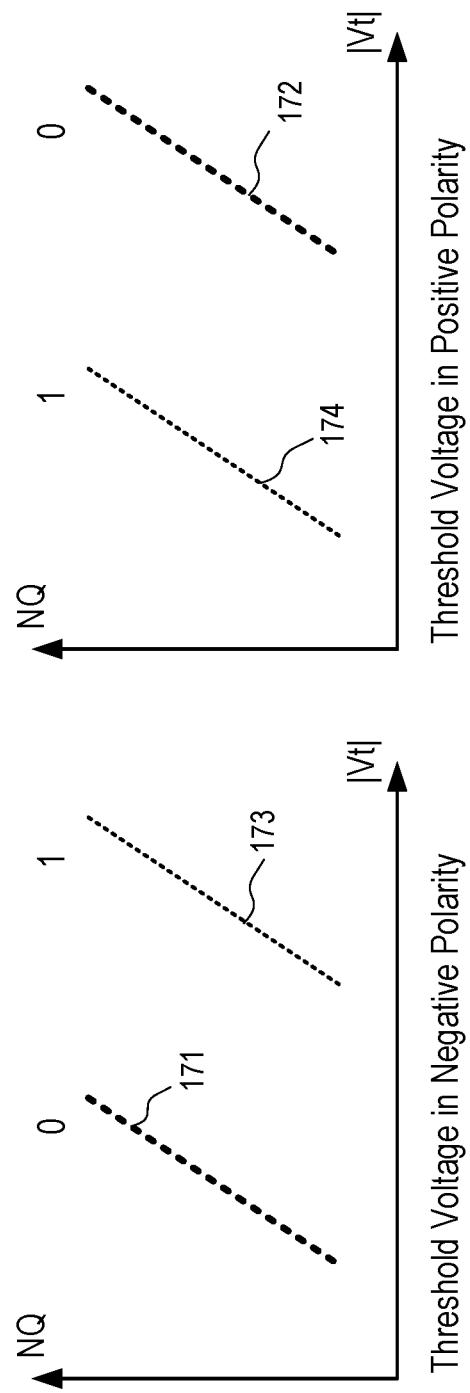
FIG. 8 shows an exemplary normal quantile (NQ) plot representing the statistical distributions of threshold voltages of memory cells.

FIG. 8 shows an exemplary normal quantile (NQ) plot representing the statistical distributions (e.g., 171-174) of threshold voltages of memory cells. In one example, the memory cells are data cells 110, and/or pattern cells 112. When a probability distribution (e.g., 171) of threshold voltages programmed in a region is a normal distribution (also known as Gaussian distribution), its normal quantile (NQ) plot is seen as aligned on a straight line (e.g., distribution 171).

A self-selecting memory cell (e.g., 103) can have a threshold voltage in negative polarity and a threshold voltage in positive polarity. When a voltage applied on the memory cell 103 in either polarity is increased in magnitude up to its threshold voltage in the corresponding polarity, the memory cell (e.g., 103) switches (e.g., snaps) from a non-conductive state to a conductive state.

The threshold voltage of a memory cell 103 in negative polarity and the threshold voltage of the memory cell 103 in positive polarity can have different magnitudes. Memory cells programmed to have large magnitudes in threshold voltages in positive polarity can have small magnitudes in threshold voltages in negative polarity; and memory cells programmed to have small magnitudes in threshold voltages in positive polarity can have large magnitudes in threshold voltages in negative polarity.

For example, a memory cell can be programmed to have a small magnitude in threshold voltage according to distribution 174 in the positive polarity to represent a value (e.g., one); and as a result, its threshold voltage has a large magnitude according to distribution 173 in the negative polarity to represent the same value (e.g., one). Alternatively, the memory cell can be programmed to have a large magnitude in threshold voltage according to distribution 172 in the positive polarity to represent another value (e.g., zero); and as a result, its threshold voltage has a smaller magnitude according to distribution 171 in the negative polarity to represent the same value (e.g., zero).

Thus, to determine whether a memory cell 103 is storing the one value (e.g., one) or the other value (e.g., zero), the read manager 113 can read the memory cell 103 in either the positive polarity or the negative polarity. If the threshold voltage of the memory cell 103 has a large magnitude according to distribution 172 in the positive polarity, it stores the other value (e.g., zero); otherwise, it stores the one value (e.g., one). Similarly, if the threshold voltage of the memory cell 103 has a large magnitude according to distribution 173 in the negative polarity, it stores the one value (e.g., one); otherwise, it stores the other value (e.g., zero).

The threshold voltage distributions of memory cells may change after a read. For example, in the positive polarity, a read can cause the high magnitude distribution 172 to shift downward, and/or the low magnitude distribution 174 to shift downward.

Similarly, in negative polarity, the read can cause the high magnitude distribution 173 to shift downward, and/or the low magnitude distribution 171 to shift downward.

Figure 9:
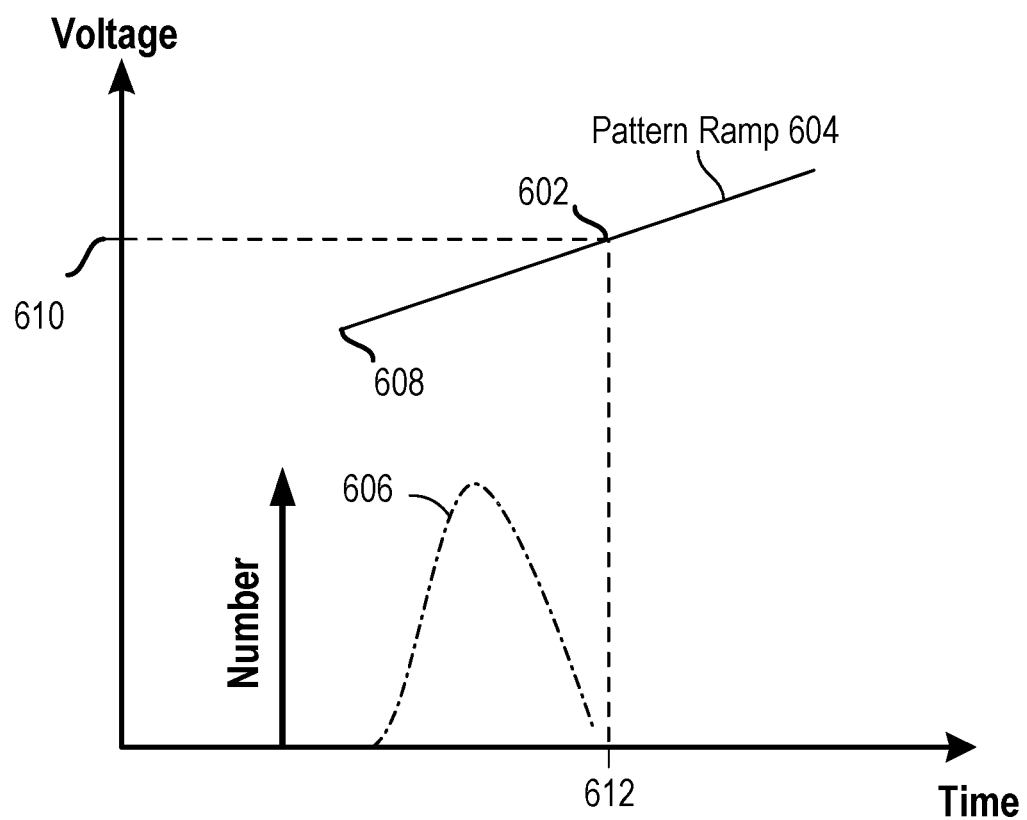
FIG. 9 shows an exemplary pattern cell snapping distribution for a pattern ramp applied to a reference pattern in a memory array, in accordance with some embodiments.

FIG. 9 shows an exemplary pattern cell snapping distribution 606 for a pattern ramp 604 applied to a reference pattern in a memory array, in accordance with some embodiments. In one example, the memory array is memory array 102. In one example, pattern ramp 604 is applied in magnitudes of equal or different voltages to each of patterns 103, 105 of FIG. 1.

Pattern cell distribution 606 illustrates a number (vertical axis) of memory cells that switch over time (horizontal axis) as pattern ramp 604 is applied to pattern cells in one of patterns 103 or 105. In one example, pattern ramp 604 (the vertical axis also shows the voltage of ramp 604) is applied starting at an initial voltage 608 and increasing in magnitude to point 602 which corresponds to a time 612 at which a threshold number (e.g., 62 or 64 cells) of the pattern cells have switched.

A controller counts a cumulative number of the pattern cells that switch. As illustrated, at point 602 on ramp 604 the controller determines that a threshold number of cells have snapped (e.g., 64 cells snap). Voltage 610 is the voltage applied at time 612, which is when the controller determines the threshold number is reached. In one embodiment, voltage 610 is used by the controller as a proxy for, or prediction of, the 1 cell threshold voltage distribution of data cells to be read. An initial read voltage for reading the data cells is selected based on voltage 610.

In one example, an offset voltage is added to voltage 610 to determine a read voltage. For example, an initial read voltage is determined by adding an additional value or offset to voltage 610. In one example, the additional value is one or two standard deviations (σ or 2σ) of a threshold voltage distribution for the data cells. In one example, the standard deviation of the threshold voltage distribution for the data cells is determined using prior data collected by the controller from operation of the memory device having the data cells.

In one embodiment, the observed switching of pattern cells can be used to determine that a biasing voltage applied to the pattern cells is higher than or equal to the average of the 1 cell distribution of a codeword. In one embodiment, it is possible to know the average of the 1 cell distribution by observing the switching of the pattern cells.

Figure 10:
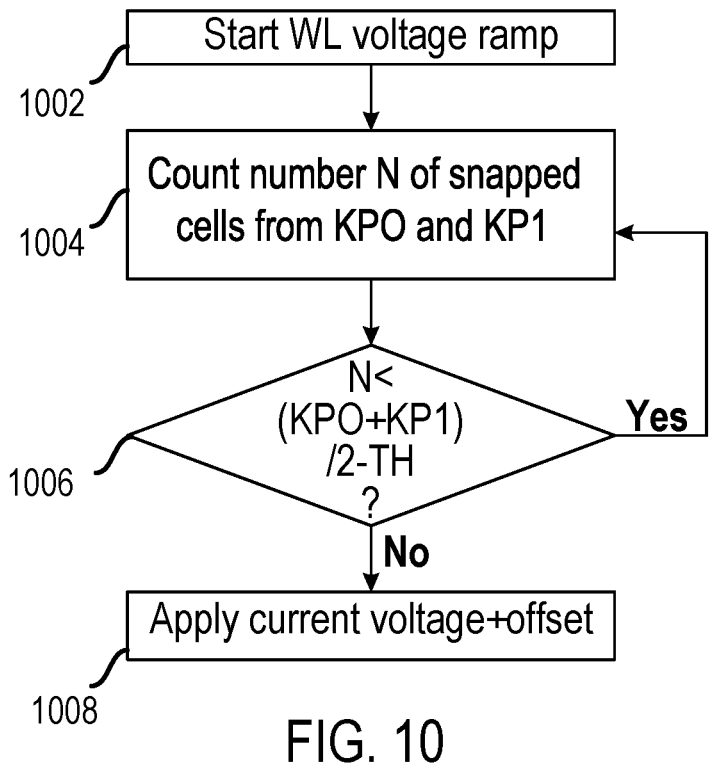
FIG. 10 shows a method for counting a number of memory cells that snap, in accordance with some embodiments.

FIG. 10 shows a method for counting a number of memory cells that snap, in accordance with some embodiments. In one example, controller 120 uses counters 104 to count a number of pattern cells 112 that snap. In one example, a number of snapping memory cells is determined from reading patterns 103, 105. In one example, a number of memory cells that snap is counted as a pattern ramp 604 is applied to each of patterns 430, 431 (e.g., ramp(s) applied in parallel).

At block 1002, a voltage ramp is applied to a wordline used to select pattern cells. A controller gradually increases a voltage of the voltage ramp over time.

At block 1004, a cumulative number (N) of snapped memory cells is counted. The counted number is determined based on snapping of cells observed for the two corresponding reference patterns (e.g., cells typically only will snap for the pattern in the lower threshold voltage SET state before the counter reaches the threshold N). In one example, the snapping of cells is determined using sensing circuitry 122. In one example, a controller monitors snapping of memory cells in two corresponding reference patterns (e.g., patterns 230, 231) (e.g., KP0, KP1).

At block 1006, the cumulative number of snapped memory cells is compared to a threshold value. In one example, the threshold value is a total number of pattern cells in two reference patterns (e.g., KP0 and KP1) divided by two (e.g., (64 cells+64 cells)/2=64 cells as a threshold). In one example, a small number TH (e.g., TH=2 cells) is subtracted from the threshold as a guard band to account for the possibility of a small number of defective cells in a pattern (e.g., (KP0+KP1)/2−TH). If the cumulative number has not yet reached the threshold value, then the voltage ramp is further increased in magnitude and additional snapping cells counted at block 1004.

At block 1008, if the cumulative number reaches the threshold value, then the current voltage applied at the time that the threshold value is reached is used to determine a read voltage. In one embodiment, a history of the voltages and corresponding snapping counts and/or times can be used to determine the read voltage. In some cases, an offset voltage (e.g., 2-5 standard deviations) can be added to the current voltage to determine a read voltage. In one example, the determined read voltage is used to read data cells 110. In one example, the determined read voltage is used to read codeword 220.

Figure 11:
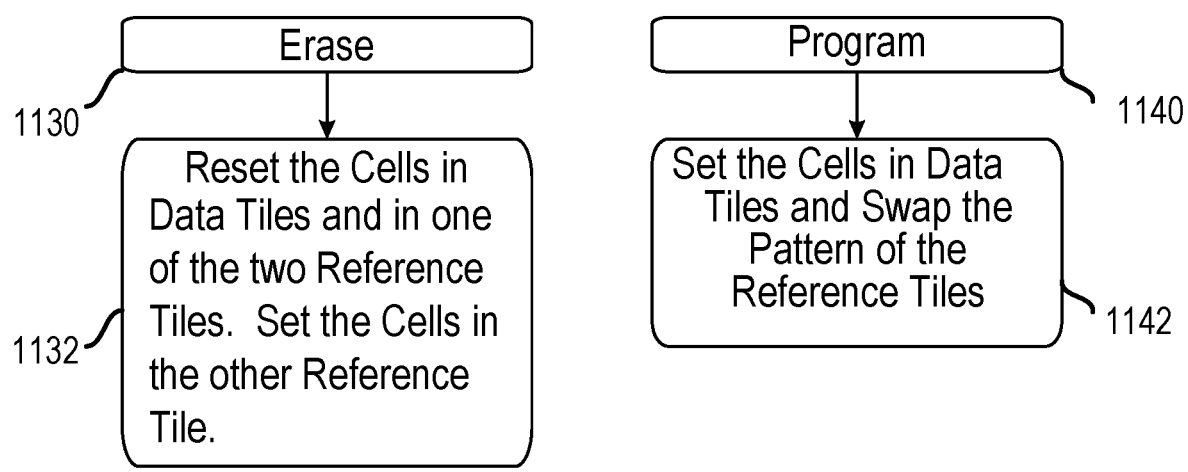
FIG. 11 shows exemplary erase and program operations for a storage device, in accordance with some embodiments.

FIG. 11 shows exemplary erase and program operations 1130, 1140 for a storage device, in accordance with some embodiments. In one example, the storage device is memory device 101. In one example, the storage device stores user data as blocks (e.g., block 420).

Erase operation 1130 is performed, for example, in response to receiving a command from a host device (e.g., host device 126) to erase user data. At block 1132, in response to receiving the command, a controller resets data cells in data tiles. The controller also resets cells (e.g., resets pattern 430) in a first tile of a pair of reference tiles. The controller sets cells (e.g., sets pattern 431) in a second tile of the pair of reference tiles.

Program operation 1140 is performed, for example, in response to receiving a command from the host device to program user data. At block 1142, in response receiving the program command, a controller sets cells in the data tiles. The controller also swaps the pattern of the two reference tiles. For example, pattern 430 is changed from zeros to ones, and pattern 431 is changed from ones to zeros.

Figure 12:
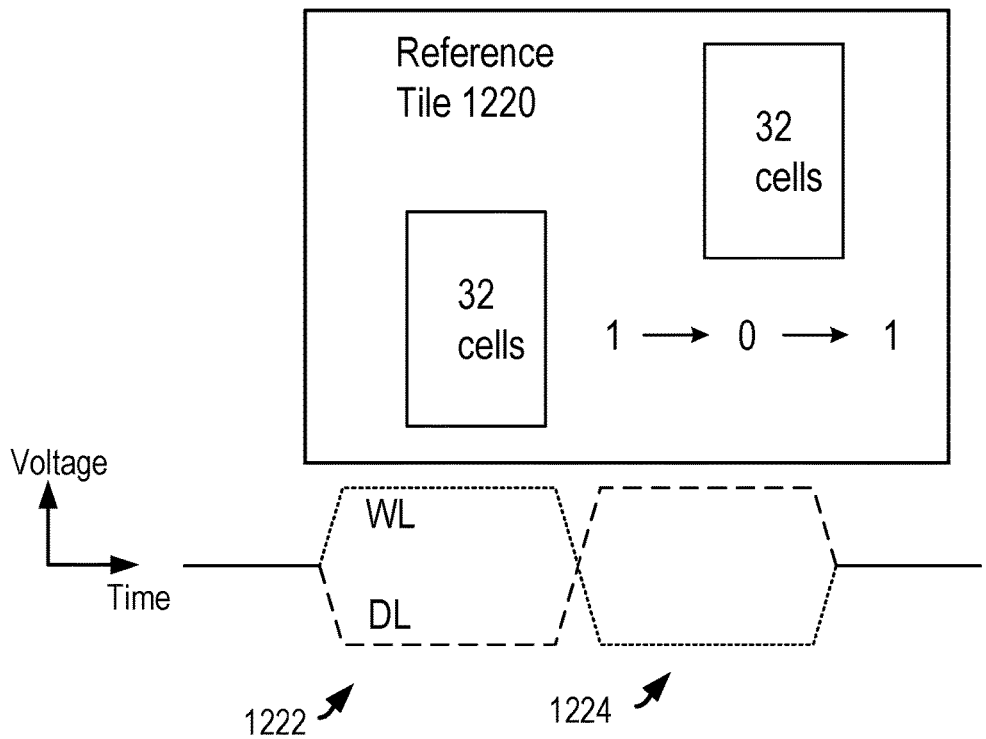
FIG. 12 shows a reference tile that includes a pattern used when performing read operations, in accordance with some embodiments.

FIG. 12 shows a reference tile 1220 that includes a pattern used when performing read operations, in accordance with some embodiments. Reference tile 1220 is an example of tile 306.

For example, the pattern includes 64 pattern cells split into two groups of 32 cells each, as illustrated. The logic state of the pattern cells is initially logic one. When the pattern is swapped (e.g., for each write operation on a codeword), voltage pulses 1222, 1224 are applied to the pattern cells to change the logic state from logic one to logic zero using pulse 1222 for a first swap, and from logic zero to logic one using pulse 1224 for a later swap. Each pulse applies wordline (WL) and digit line (DL) voltages in a profile as illustrated.

Figure 13:
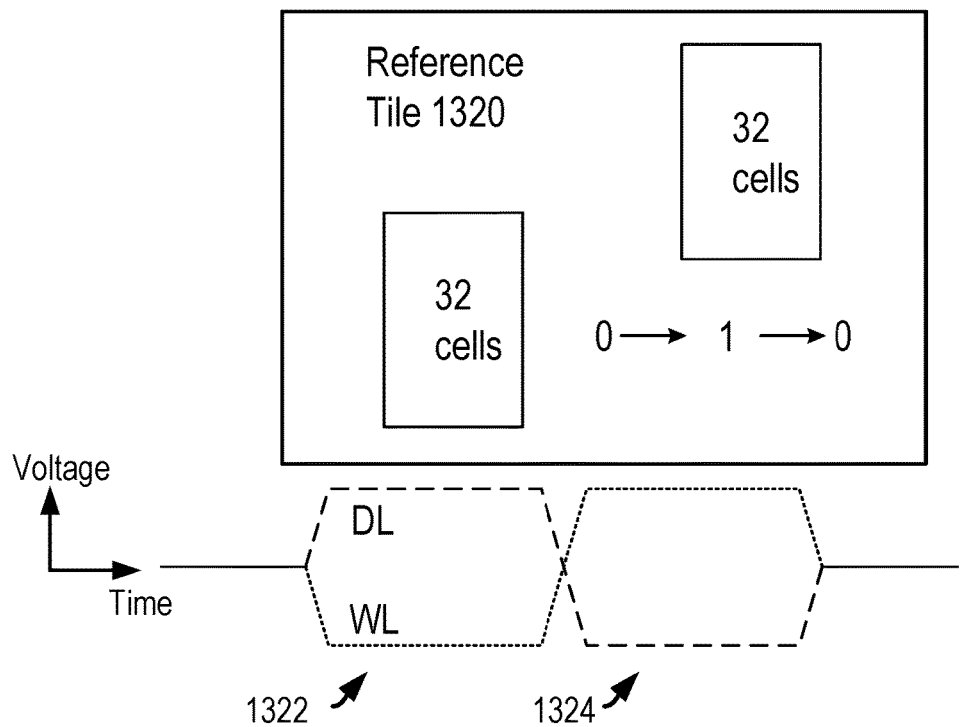
FIG. 13 shows a reference tile that is used in conjunction with the reference tile of FIG. 12 when performing read operations, in accordance with some embodiments.

FIG. 13 shows a reference tile 1320 that is used in conjunction with reference tile 1220 of FIG. 12 when performing read operations, in accordance with some embodiments. Reference tile 1320 is an example of tile 308.

For example, pattern includes 64 pattern cells split into two groups of 32 cells each, as illustrated. Logic state of the pattern cells is initially logic zero. When swapping the pattern, voltage pulses 1322, 1324 are applied to the pattern cells to change the logic state from logic zero to logic one using pulse 1322 for a first swap, and from logic one to logic zero using pulse 1324 for a later swap. Each pulse applies wordline (WL) and digit line (DL) voltages in a profile as illustrated.

In one embodiment, reference tiles 1220 and 1320 are each associated with the same codeword. Logic states of the pattern cells in each reference tile are swapped periodically. In one example, the logic states are swapped each time the associated codeword is written. In one example, the logic states are swapped each time the associated codeword is erased. In one example, the logic states are swapped only the first time that the associated codeword is programmed after being erased.

In one example, during a read operation, there is no need to know in which of the two reference tiles 1220, 1320 the SET cells are located. In one example, the foregoing is determined while reading the patterns during a read operation.

In one embodiment, during program and/or erase operations, data about the content of the reference tiles 1220, 1320 can be stored in a nonvolatile or volatile register to save read time. In one example, the register is register 107 of FIG. 1. For example, data in the register can indicate to a controller which of the two reference tiles needs to be SET and which RESET, for a given erase or program operation.

In one embodiment, the program or erase state of a region is determined by reading reference patterns and counting the number of snapping bits for each pattern. After reading the reference patterns, depending on which reference pattern has the SET cells and which pattern has the RESET cells, a controller determines whether the region is erased or not. This operation requires time for a read. When the controller is executing an erase or program command, the controller may not need to know the content of the region. Instead, the controller may only need to modify the cells and blindly change the content of the reference patterns.

In some cases, a controller may benefit from knowing the state of the region before modifying the cells for various reasons. One reason is to avoid unnecessary erase operations if the region is already erased to save power and time. Another reason is to check whether the region is being programmed for the first time or has had one or more bits manipulated (changed). In the first case, the controller can program the content without any further check of the region content. In the second case, the controller can check in advance the region content to avoid unnecessary program operations. This can provide power saving, and avoid cell wear out. In one example, if there is an ECC in the region internal to the memory device (component), the controller may need to change the region content (and then likely also, for example, change 0 s into 1 s).

In one embodiment, reference patterns (e.g., KP0 and KP1) can be put in the same tile (e.g., share the program circuitry) if write performance requirements will allow.

Figure 14:
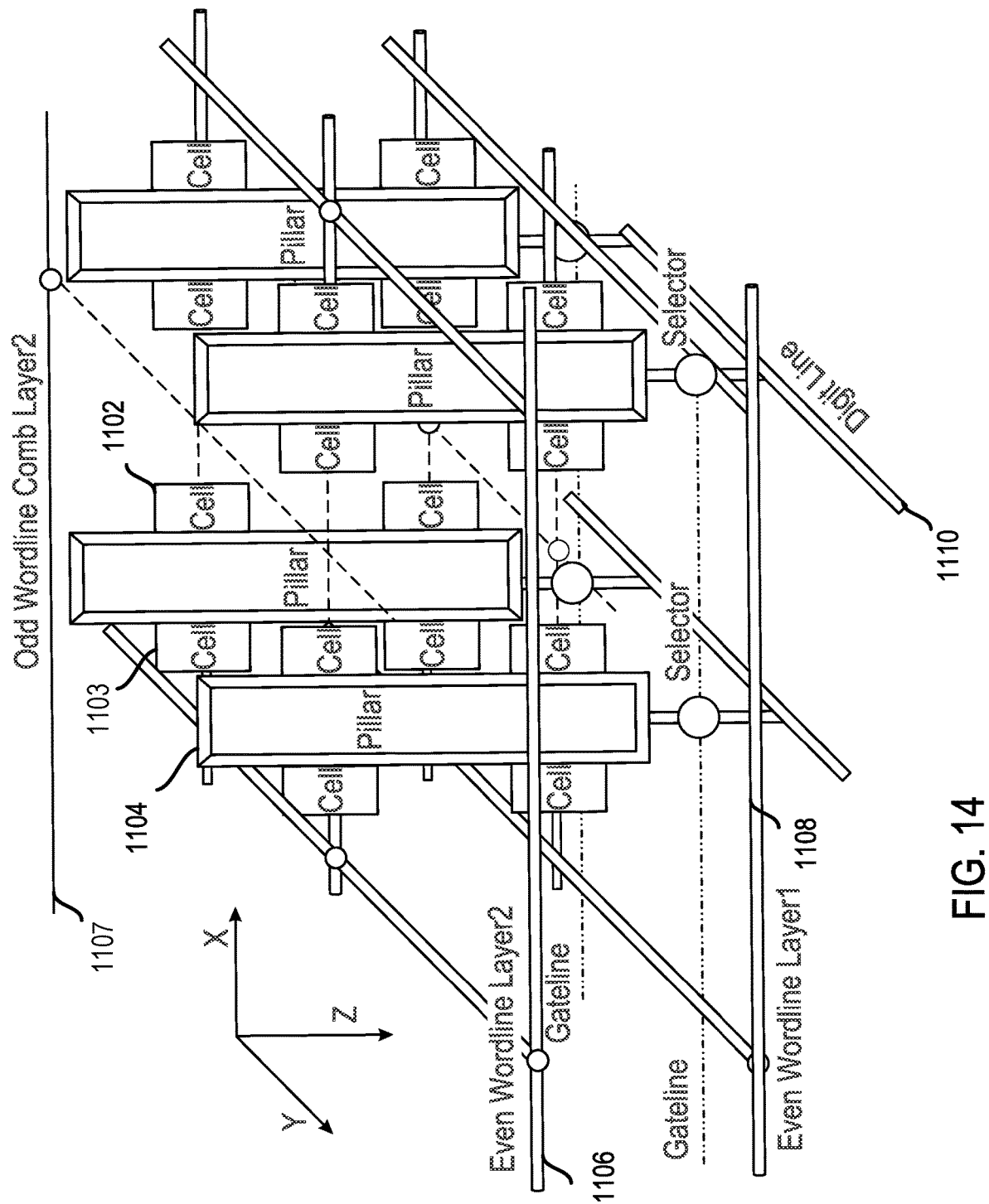
FIG. 14 shows an exemplary three-dimensional memory array structure, in accordance with some embodiments.

FIG. 14 shows an exemplary three-dimensional memory array structure, in accordance with some embodiments. The memory array and memory cells described herein are not limited to use in a planar architecture (e.g., with cells at crossing of wordlines (WLs) and bitlines (BLs) on different levels). Instead, the approach also can be used for vertical architectures (e.g., vertical BL pillars crossing horizontal WL planes).

An example of a vertical architecture that can be used with embodiments described in this disclosure is illustrated in FIG. 14. As illustrated, a memory array includes memory cells 1102, 1103. Each memory cell 1102, 1103 can be selected using a wordline (e.g., 1106, 1107, or 1108) and a digit line (e.g., 1110). Memory cells 1102, 1103 are an example of data cells 110 or pattern cells 112 of FIG. 1.

In one embodiment, each wordline extends in one of a plurality of horizontal planes of wordlines 1106, 1107, 1108 stacked vertically above a semiconductor substrate (not shown). Each digit line or bitline (e.g., 1110) includes a pillar 1104. Each pillar 1104 extends vertically away from the semiconductor substrate. Each memory cell 1102, 1103 is located on sides of one of pillars 1104.

In one embodiment, the memory array has a vertical array architecture comprising vertical bitlines (e.g., vertical pillars 1104) or digit lines intersecting a plurality of horizontal decks of wordlines (e.g., even wordlines 1106 and odd wordlines 1107). Each deck is configured as two interdigitated wordline combs so that each bitline or digit line forms two cells 1102, 1103 at each of the decks. In one example, even wordlines 1106 are interdigitated with odd wordlines 1107 in a comb structure as illustrated.

Figure 15:
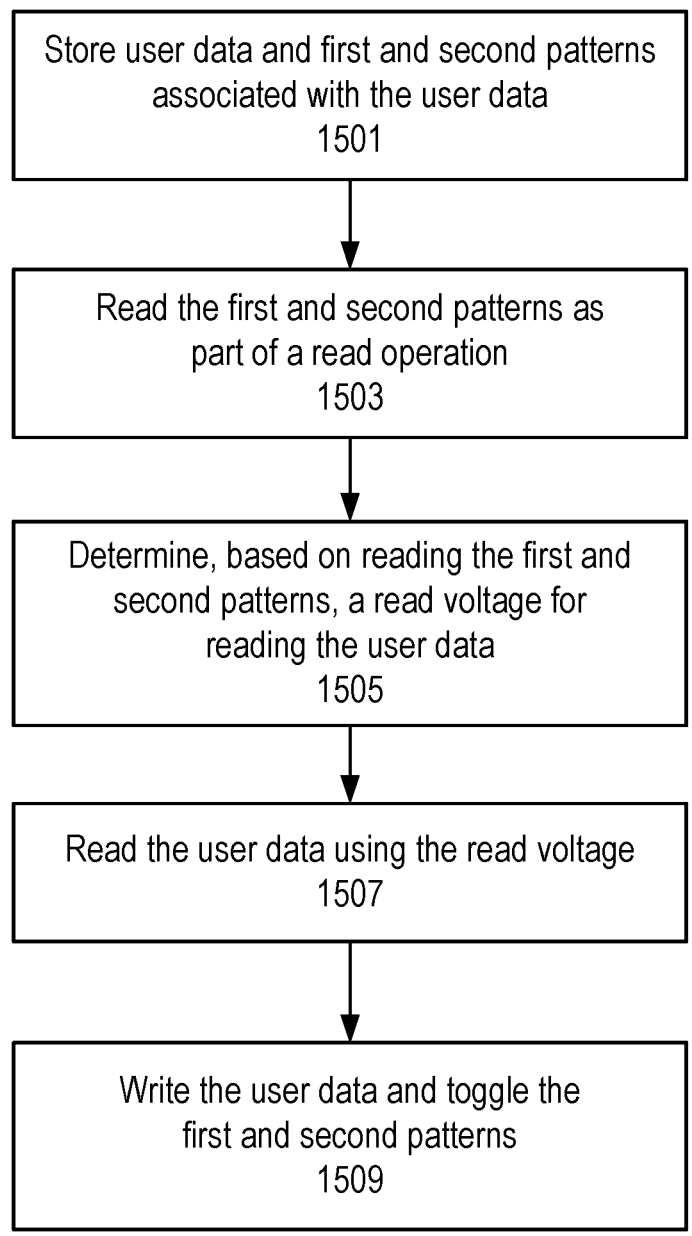
FIG. 15 shows a method for toggling or swapping reference patterns to select read voltages, in accordance with some embodiments.

FIG. 15 shows a method for toggling or swapping reference patterns to select read voltages, in accordance with some embodiments. For example, the method of FIG. 15 can be implemented in the system of FIG. 1.

The method of FIG. 15 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 15 is performed at least in part by one or more processing devices (e.g., controller 120 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1501, user data and first and second patterns associated with the user data are stored. In one example, the user data is codeword 220 or block 420. In one example, the first and second patterns are patterns 230, 231, which are associated with codeword 220. In one example, the first and second patterns are added to the codeword and written with the codeword.

At block 1503, the first and second patterns are read as part of a read operation. In one example, a controller receives a command from a host device that requires reading data from memory array 102. In response to receiving the command, the controller implements the read operation. As part of the read operation, the controller reads the first and second patterns to determine data regarding a threshold voltage distribution of data cells in the memory array. In one example, the controller determines a reference tile that stores memory cells in a SET state, and counts a number of the memory cells in the reference tile that snap until a threshold is reached.

At block 1505, a read voltage for reading the user data is determined based on results from reading the first and second patterns. In one example, voltage 610 at time 612 of FIG. 9 is used by controller 120 to select a read voltage for reading data cells of codeword 224.

At block 1507, the user data is read using the read voltage. In one example, user data stored in block 420 is read.

In one embodiment, blocks 1503, 1505, 1507 are performed sequentially as part of a read operation. For example, a ramping voltage is first applied to memory cells of known pattern tiles. Then, after detecting switching of memory cells in the tiles, a final read voltage is calculated. Finally, the calculated final read voltage is applied to memory cells storing user data.

In other embodiments, blocks 1503, 1505, 1507 are performed at least partially in parallel as part of a read operation. For example, a ramping voltage can be applied concurrently to memory cells for both known pattern data and user data. A final read voltage is determined based on switching of cells for the known pattern data. The final read voltage is used to determine an ending (final or maximum) voltage for reading the user data. In one example, a ramping voltage is applied to the user data at voltages lower than this final read voltage at the same time that a ramping voltage is applied to known pattern tiles (the ramping voltages are applied in parallel). Thus, the final read voltage is calculated "on the fly" while the user data is being read. For example, a voltage ramp applied to the user data is started before the determination of the final read voltage. This can reduce the overall time required for a read operation.

At block 1509, the user data is written and the first and second patterns are toggled or swapped. After the user data is read one or more times as described above, user data can be changed by writing one or more new logic states to data cells that store at least part of the user data in a memory array. When new logic states are written for the user data, the first and second patterns are swapped (e.g., swapped as described for FIG. 2 or 4).

In one embodiment, an apparatus comprises: a memory array (e.g., 102) comprising memory cells configured to store codewords; bias circuitry (e.g., 124) configured to apply voltages to the memory cells when reading and writing the codewords; sensing circuitry (e.g., 122) configured to read the memory cells; and a controller (e.g., 120).

The controller is configured to: write, using the bias circuitry, a first codeword, and a first pattern (e.g., SET cells) and a second pattern (e.g., RESET cells) associated with the first codeword, wherein the first pattern corresponds to a first average threshold voltage, the second pattern corresponds to a second average threshold voltage, and a magnitude of the first average threshold voltage is lower than a magnitude of the second average threshold voltage; apply, using the bias circuitry, a voltage (e.g., voltage ramp) to memory cells of the first and second patterns; determine, using the sensing circuitry, a number of the memory cells of the first and second patterns that switch (e.g., threshold or snap) when applying the voltage; determine whether the number of memory cells that switch has reached a threshold; in response to determining that the number of memory cells has reached the threshold, determine a read voltage based on the voltage applied to the memory cells (e.g., read voltage is based on the voltage of the ramp when the threshold is reached); and read the first codeword by applying, using the bias circuitry, the read voltage to memory cells of the first codeword.

In one embodiment, the first pattern (e.g., SET cells of KP0) is stored in a first tile of the memory array, and the second pattern (e.g., RESET cells of KP1) is stored in a second tile of the memory array.

In one embodiment, for only a first write of the first codeword following an erase of the first codeword, the first and second patterns are swapped (e.g., KP0 and KP1 are swapped for the first write that occurs after the first codeword has been erased when using a storage specification).

In one embodiment, during every write of the first codeword, the first and second patterns are swapped (e.g., KP0 and KP1 are swapped for each write when using a memory specification).

In one embodiment, the apparatus further comprises a randomizer (e.g., 180), wherein the controller is further configured to: during every write of the first codeword, use the randomizer to determine whether to swap the first and second patterns; and in response to determining to swap the first and second patterns, change logic states of the first and second patterns (e.g., randomizer is used to determine whether KP0 and KP1 are swapped when writing the first codeword).

In one embodiment, determining the read voltage comprises adding an offset voltage to an applied voltage that causes the number of memory cells that switch to reach the threshold.

In one embodiment, the offset voltage corresponds to a statistical characteristic (e.g., standard deviation) of a threshold voltage distribution of memory cells storing codewords in the memory array.

In one embodiment, the first codeword is written to a first tile (e.g., tile 304) that stores other codewords, the first pattern is written to a second tile (e.g., tile 306) that stores patterns used for reading the other codewords, and the second pattern is written to a third tile (e.g., tile 308) that stores patterns used for reading the other codewords.

In one embodiment, the controller is further configured to determine a number of the memory cells of the first codeword that switch when reading the first codeword.

In one embodiment, the first codeword is in a fully-erased state (e.g., all memory cells are in a RESET state) when the first codeword is read, and the number of memory cells of the first codeword that switch is zero.

In one embodiment, all memory cells in the first pattern are in a first logic state (e.g., all cells are logic 1 in a SET state) that corresponds to the first average threshold voltage, and all memory cells in the second pattern are in a second logic state (e.g., all cells are logic 0 in a RESET state) that corresponds to the second average threshold voltage.

In one embodiment, when determining the number of the memory cells that switch, only memory cells of the first pattern switch, and no memory cells of the second pattern switch.

In one embodiment, applying the read voltage is performed by applying a voltage ramp to the memory cells of the first codeword, and increasing the voltage ramp to the read voltage.

In one embodiment, the controller is further configured to stop applying the voltage ramp after the voltage of the voltage ramp reaches the read voltage.

In one embodiment, each of the codewords is a block (e.g., block 420) of data stored in the memory array by a host device using logical block addressing (LBA).

In one embodiment, an apparatus comprises: a memory array having memory cells configured to store blocks of data, each block comprising data cells that store user data, and each block associated with pattern cells used for selecting a voltage to read the data cells; bias circuitry configured to apply voltages to erase and program the memory cells, wherein the memory cells can be programmed to a first logic state (e.g., SET state or logic 1) corresponding to a first average threshold voltage, or erased to a second logic state (e.g., RESET state or logic 0) corresponding to a second average threshold voltage, and wherein a magnitude of the first average threshold voltage is lower than a magnitude of the second average threshold voltage; sensing circuitry configured to read the memory cells; and a controller.

The controller is configured to: erase first data cells in a first block (e.g., block 420) to the second logic state (e.g., RESET state); program first pattern cells (e.g., pattern 431) to the first logic state (e.g., SET state), and erase second pattern cells (e.g., pattern 430) to the second logic state (e.g., RESET state), wherein the first and second pattern cells are associated with the first block; program at least a portion of the first data cells to the first logic state (e.g., SET state); and in association with programming the first data cells, erase the first pattern cells to the second logic state (e.g., RESET state), and program the second pattern cells to the first logic state (e.g., SET state).

In one embodiment, the programming of the first data cells is a first programming of any portion of the first data cells following an erase of the first data cells; and the controller is further configured to erase the first pattern cells and program the second pattern cells only for the first programming following the erase of the first data cells.

In one embodiment, the controller is further configured to: program an additional portion of the first data cells to the first logic state (e.g., SET state) without changing a logic state of the first and second pattern cells; after programming the additional portion, erase all of the first data cells to the second logic state (e.g., RESET state); and after erasing all of the first data cells, program the first pattern cells from the second logic state to the first logic state (e.g., SET state), and erase the second pattern cells from the first logic state to the second logic state (e.g., RESET state).

In one embodiment, the controller is further configured to: perform a read operation to read the first data cells, the read operation including applying, using the bias circuitry, a voltage ramp to the first and second pattern cells; determine a read voltage for reading the first data cells, the read voltage based at least in part on counting a number of the first and second pattern cells that switch (e.g., threshold or snap) while applying the voltage ramp; apply, using the bias circuitry, the read voltage to the first data cells; and read, using the sensing circuitry, the first data cells.

In one embodiment, the first pattern cells are located in a first tile of the memory array; and the second pattern cells are located in a second tile of the memory array.

In one embodiment, the first and second pattern cells are located in a same tile of the memory array.

In one embodiment, the programming of the first pattern cells is concurrent with the erasing of the second pattern cells.

In one embodiment, the apparatus further comprises a register (e.g., 107), wherein the controller is further configured to: determine data regarding a content of the first and second pattern cells; and store, in the register, the data regarding the content.

In one embodiment, the data regarding the content indicates which of the first or second pattern cells need to be changed to a SET state, and which of the first or second pattern cells need to be changed to a RESET state.

In one embodiment, the controller is further configured to store a condition of at least one of the first or second pattern cells as being inverted or not inverted. In one example, the condition is stored in one of registers 107.

In one embodiment, a method comprises: storing user data, a first pattern in a first logic state (e.g., SET cells), and a second pattern in a second logic state (e.g., RESET cells), wherein the first and second patterns are associated with the user data; reading the first and second patterns; determining, based on reading the first and second patterns, a read voltage for reading the user data; and reading the user data using the read voltage.

In one embodiment, the method further comprises, for each write operation associated with the user data, swapping logic states of the first and second patterns (e.g., the first pattern is changed from SET to RESET, and the second pattern is changed from RESET to SET).

In one embodiment, the method further comprises receiving a command to read the user data from a host device (e.g., 126), wherein the first and second patterns are read as part of a read operation performed in response to receiving the command.

In one embodiment, a memory device is configured to implement similar usage of pattern cells and associated data cells. For a memory device operating in a storage specification type of scenario (e.g., erase, program only one state), an assignment of first and second patterns (e.g., KP0 and KP1) to reference tiles (e.g., tiles 1220, 1320) can be used to distinguish the first programming on an erased codeword from subsequent programming on the codeword.

In one example, for an erased codeword, patterns in reference tiles A (B) are set respectively to 1 (0). For a first program of the erased codeword, the patterns are swapped (e.g., inverted) (e.g., change 1 to 0 in tile A, and change 0 to 1 in tile B).

For the programmed codeword, the patterns in reference tiles A (B) remain set to 0 (1). The patterns are inverted again only when erasing the codeword. With this usage model, the patterns and codeword (user data) will undergo the same number of cycles.

In one embodiment, the encoding above to recognize the first program on an erased region (e.g., erased block or codeword) can be used to store the inverted/not inverted condition of the data in the codeword. This approach can be useful in case of an extensive use of masked write commands by a controller because all the untouched bits can be inverted and then be cycled in a random fashion like the written bits. This requires that a read be performed before writing.

In one embodiment, a memory device operating in a memory specification type of scenario (e.g., no erase, only overwrite) is configured to implement similar usage of pattern cells and associated data cells. Stored user data is randomized to avoid having large differences in the number of cycles for each bit of a stored codeword. This is a particular problem, for example, in the event of a hacker-attack scenario.

For example, in the case of totally random user patterns, reference pattern bits will be cycled (e.g., 0 to 1 to 0) every two program commands. User data will have 1, 0.5, or 0 cycles in the same time frame. On average, pattern bits will cycle twice as many times as the data bits (e.g., each bit of a codeword will be written to either 0 or 1 about 50% of the time).

In one embodiment, the write of pattern bits can also be randomized. Because the content of, for example, reference tiles A and B only needs to be of opposite logic state (e.g., tile A as all 0 s, and tile B as all 1 s), it is not necessary to read the tiles in advance, and the tile content can be decided randomly. This can make the write operation easier, faster, and require less power.

In one example, the above randomization can be performed both on die and at controller level.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus comprising:
a memory array comprising memory cells;
bias circuitry configured to apply voltages to the memory cells when reading and writing codewords; and
a controller configured to:
write a first codeword, and a first pattern and a second pattern associated with the first codeword;
apply, using the bias circuitry, a voltage to memory cells of the first and second patterns;
determine a number of cells, among the memory cells of the first and second patterns, that switch when applying the voltage;
determine, in response to a determination that the number of cells, among the memory cells of the first and second patterns, that switch has reached a threshold, a read voltage based on the voltage applied to the memory cells of the first and second patterns; and
read the first codeword by applying the read voltage to memory cells of the first codeword.

2. The apparatus of claim 1, wherein for only a first write of the first codeword following an erase of the first codeword, the first and second patterns are swapped.

3. The apparatus of claim 1, wherein during every write of the first codeword, the first and second patterns are swapped.

4. The apparatus of claim 1, further comprising a randomizer, wherein the controller is further configured to:
during every write of the first codeword, use the randomizer to determine whether to swap the first and second patterns; and
in response to determining to swap the first and second patterns, change logic states of the first and second patterns.

5. The apparatus of claim 1, wherein determining the read voltage comprises adding an offset voltage to an applied voltage that causes the number of memory cells that switch to reach the threshold.

6. The apparatus of claim 5, wherein the offset voltage corresponds to a statistical characteristic of a threshold voltage distribution of memory cells storing codewords in the memory array.

7. The apparatus of claim 1, wherein the first codeword is written to a first tile that stores other codewords, the first pattern is written to a second tile that stores patterns used for reading the other codewords, and the second pattern is written to a third tile that stores patterns used for reading the other codewords.

8. The apparatus of claim 1, wherein the controller is further configured to determine a number of the memory cells of the first codeword that switch when reading the first codeword.

9. The apparatus of claim 8, wherein the first codeword is in a fully-erased state when the first codeword is read, and the number of memory cells of the first codeword that switch is zero.

10. The apparatus of claim 1, wherein all memory cells in the first pattern are in a first logic state that corresponds to a first average threshold voltage, and all memory cells in the second pattern are in a second logic state that corresponds to a second average threshold voltage.

11. The apparatus of claim 1, wherein when determining the number of the memory cells that switch, only memory cells of the first pattern switch, and no memory cells of the second pattern switch.

12. The apparatus of claim 1, wherein applying the read voltage is performed by applying a voltage ramp to the memory cells of the first codeword, and increasing the voltage ramp to the read voltage.

13. The apparatus of claim 12, wherein the controller is further configured to stop applying the voltage ramp after the voltage of the voltage ramp reaches the read voltage.

14. The apparatus of claim 1, wherein the first codeword is a block of data stored in the memory array by a host device using logical block addressing.

15. An apparatus comprising:
a memory array having memory cells configured to store blocks of data, each block comprising data cells that store user data, and each block associated with pattern cells used for selecting a voltage to read the data cells, wherein the memory cells can be programmed to a first logic state corresponding to a first average threshold voltage, or erased to a second logic state corresponding to a second average threshold voltage; and
a controller configured to:
erase first data cells in a first block to the second logic state;
program first pattern cells to the first logic state, and erase second pattern cells to the second logic state, wherein the first and second pattern cells are associated with the first block;
program at least a portion of the first data cells to the first logic state; and
in association with programming the first data cells, erase the first pattern cells to the second logic state, and program the second pattern cells to the first logic state.

16. The apparatus of claim 15, wherein:
the controller is further configured to erase the first pattern cells and program the second pattern cells only for the first programming following the erase of the first data cells.

17. The apparatus of claim 15, wherein the controller is further configured to:
program an additional portion of the first data cells to the first logic state without changing a logic state of the first and second pattern cells;
after programming the additional portion, erase all of the first data cells to the second logic state; and
after erasing all of the first data cells, program the first pattern cells from the second logic state to the first logic state, and erase the second pattern cells from the first logic state to the second logic state.

18. The apparatus of claim 15, wherein the controller is further configured to:

perform a read operation to read the first data cells, the read operation including applying, using bias circuitry, a voltage ramp to the first and second pattern cells;
determine a read voltage for reading the first data cells, the read voltage based at least in part on counting a number of the first and second pattern cells that switch while applying the voltage ramp;
apply, using the bias circuitry, the read voltage to the first data cells; and
read, using sensing circuitry, the first data cells.

19. The apparatus of claim 15, wherein:
the first pattern cells are located in a first tile of the memory array; and
the second pattern cells are located in a second tile of the memory array.

20. The apparatus of claim 15, wherein the first and second pattern cells are located in a same tile of the memory array.

21. The apparatus of claim 15, wherein the programming of the first pattern cells is concurrent with the erasing of the second pattern cells.

22. The apparatus of claim 15, further comprising a register, wherein the controller is further configured to:
determine data regarding a content of the first and second pattern cells; and
store, in the register, the data regarding the content.

23. The apparatus of claim 22, wherein the data regarding the content indicates which of the first or second pattern cells need to be changed to a SET state, and which of the first or second pattern cells need to be changed to a RESET state.

24. The apparatus of claim 15, wherein the controller is further configured to store a condition of at least one of the first or second pattern cells as being inverted or not inverted.

25. A method comprising:
storing user data, a first pattern in a first logic state, and a second pattern in a second logic state, wherein the first and second patterns are associated with the user data, and the first and second logic states are different;
reading the first and second patterns;
determining, based on reading the first and second patterns, a read voltage for reading the user data;
reading the user data by applying a voltage ramp, wherein a magnitude of the voltage ramp is increased until the magnitude reaches the maximum read voltage; and
for each write operation associated with the user data, swapping logic states of the first and second patterns.

26. The method of claim 25, further comprising receiving a command to read the user data from a host device, wherein the first and second patterns are read as part of a read operation performed in response to receiving the command.

27. The method of claim 25, wherein the voltage ramp is applied to memory cells that store the user data, and the voltage ramp is initiated prior to determining the read voltage.

* * * * *